US012625096B2

(12) United States Patent
Glavicic

(10) Patent No.: US 12,625,096 B2
(45) Date of Patent: May 12, 2026

(54) MEASUREMENT AND DETERMINATION OF CRYSTALLOGRAPHIC TEXTURE WITH RESPECT TO POSITION

(71) Applicant: Rolls-Royce Corporation, Indianapolis, IN (US)

(72) Inventor: Michael George Glavicic, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 279 days.

(21) Appl. No.: 18/598,925

(22) Filed: Mar. 7, 2024

(65) Prior Publication Data

US 2025/0283841 A1 Sep. 11, 2025

(51) Int. Cl.
*G01N 23/207* (2018.01)
*G01N 23/20058* (2018.01)
*G01N 23/203* (2006.01)

(52) U.S. Cl.
CPC ... *G01N 23/2076* (2013.01); *G01N 23/20058* (2013.01); *G01N 23/203* (2013.01); *G01N 2223/304* (2013.01); *G01N 2223/345* (2013.01)

(58) Field of Classification Search
CPC ......... G01N 23/2076; G01N 23/20058; G01N 23/203
USPC .......................................... 382/108
See application file for complete search history.

(56) References Cited

U.S. PATENT DOCUMENTS 10,323,312 B2 * 6/2019 Glavicic ................ C22F 1/002
10,845,321 B2 * 11/2020 Glavicic ................ G01J 5/38

11,467,133 B2 10/2022 Tian et al.
11,598,981 B2 3/2023 Satko et al.
11,719,653 B1 * 8/2023 Najafi ................ H10N 60/0408
12,488,256 B2 * 12/2025 Glavicic ............... G01M 13/00
2013/0208951 A1 8/2013 Salem et al.
2013/0253858 A1 9/2013 Glavicic et al.
2014/0074410 A1 3/2014 Glavicic et al.

(Continued)

OTHER PUBLICATIONS

Glavicic et al., "A method to determine the orientation of the high-temperature beta phase from measured EBSD data for the low-temperature alpha phase in Ti-6A1-4V", Materials Science and Engineering, May 28, 2022, 10 pp.

(Continued)

*Primary Examiner* — William D Titcomb

(74) *Attorney, Agent, or Firm* — Shumaker & Sieffert, P.A.

(57) ABSTRACT

An example method includes measuring, by at least one of a polarized light device, a spatially resolved acoustic spectroscopy device, or an eddy current device, an alpha phase data set indicative of an alpha phase of a crystalline structure of a material. The method includes receiving, by processing circuitry, the alpha phase data set, wherein the alpha phase data set comprises a plurality of pixels, wherein each pixel of the plurality of pixels includes a position, a first Euler angle, a second Euler angle, and a third Euler angle, wherein the third Euler angle is missing or erroneous. The method also includes adjusting, by the processing circuitry, the third Euler angle of a pixel of the plurality of pixels and storing, by the processing circuitry and based on adjusting the third Euler angle of the pixel reducing a total beta phase misorientation, the alpha phase data set.

20 Claims, 25 Drawing Sheets
(9 of 25 Drawing Sheet(s) Filed in Color)

700 — RECEIVE ALPHA PHASE DATA SET OF MEASURED EULER ANGLES

702 — ZERO THE MEASURED THIRD EULER ANGLES AND DETERMINE ALPHA GRAIN IDs

704 — DETERMINE WHICH ALHA PHASE GRAINS MAY BE FROM THE SAME PRIOR BETA GRAIN

706 — ADJUST VALUE OF THIRD EULER ANGLE AND DETERMINE BURGERS IT SOLUTIONS THAT REDUCE A TOTAL BETA PHASE MISORIENTATION

708 — REFINE DETERMINATION OF THE BURGERS IT SOLUTIONS THAT REDUCES THE TOTAL BETA PHASE MISORIENTATION

710 — PERTURB THE VALUE OF THIRD EULER ANGLE AND REFINE DETERMINATION OF THE BURGERS IT SOLUTIONS THAT REDUCES THE TOTAL BETA PHASE MISORIENTATION

712 — DETERMINE THIRD EULER ANGLES

714 — DETERMINE AN MTR BASED ON THE CORRECTED ALPHA PHASE DATA SET

(56) References Cited

U.S. PATENT DOCUMENTS

2019/0086343 A1    3/2019  Cernatescu et al.

OTHER PUBLICATIONS

Glavicic et al., "An automated method to determine the orientation of the high-temperature beta phase from measured EBSD data for the low-temperature alpha-phase in Ti-6A1-4V", Materials Science and Engineering, Oct. 28, 2022, 7 pp.
Glavicic et al., "The origins of mictrotexture in deuplex Ti alloys", Materials Science and Engineering, Feb. 4, 2009, 5 pp.
Glavicic et al., "Validation of an automated EBSD method to deduce the ß-phase texture in Ti-6A1-4V with a colony—a microstructure", Materials Science amd Engineering, Jun. 24, 2004, 5 pp.
Livings et al., "Detection of microtexture regions in titanium turbine engine disks using process compensated resonance testing: A modeling study", 45th Annual Review of Progress in Quantitative Nondestructive Evaluation, vol. 38, May 8, 2019, 11 pp.

* cited by examiner

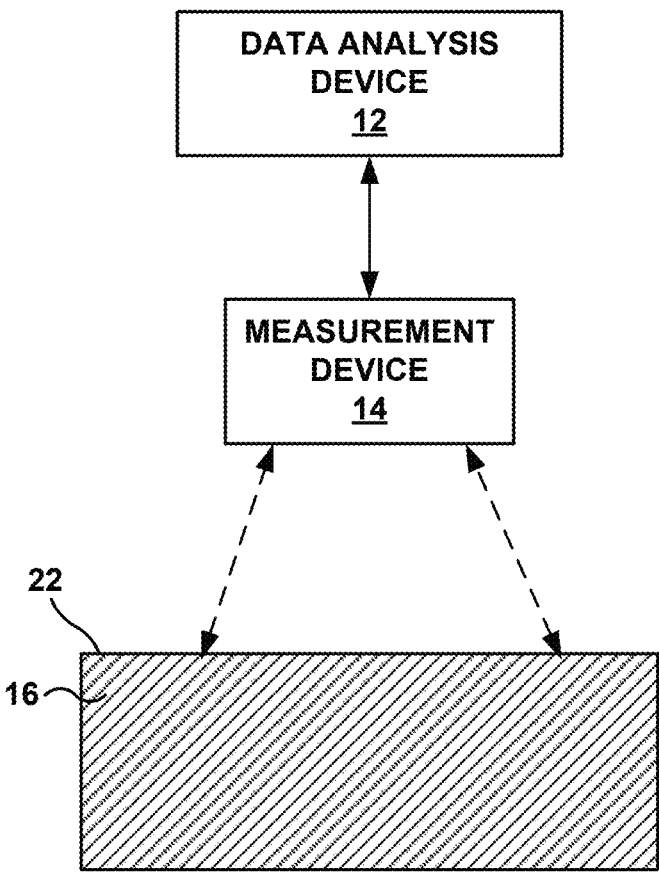
FIG. 1
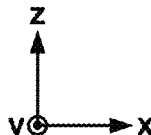

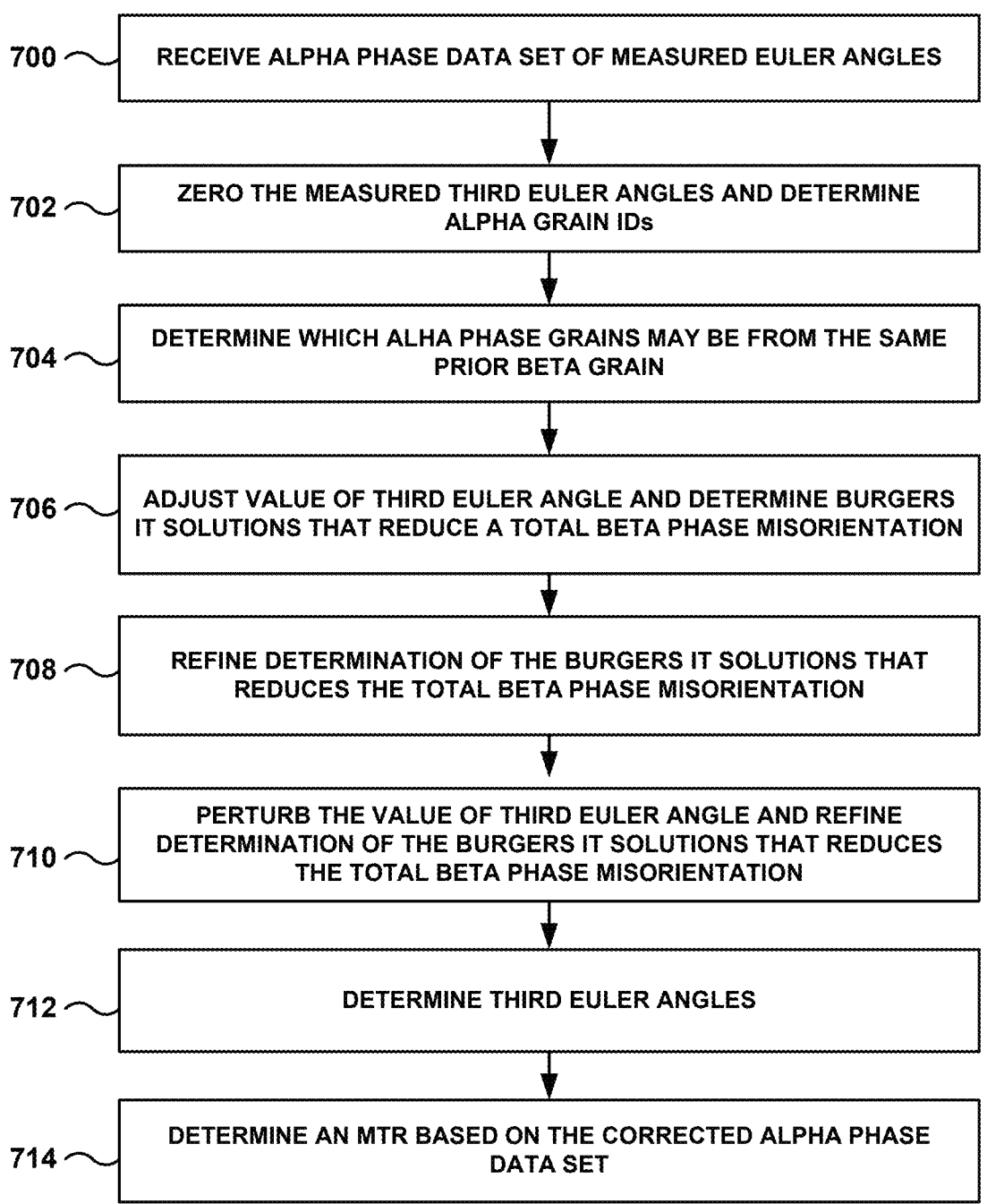

700 — RECEIVE ALPHA PHASE DATA SET OF MEASURED EULER ANGLES

702 — ZERO THE MEASURED THIRD EULER ANGLES AND DETERMINE ALPHA GRAIN IDs

704 — DETERMINE WHICH ALHA PHASE GRAINS MAY BE FROM THE SAME PRIOR BETA GRAIN

706 — ADJUST VALUE OF THIRD EULER ANGLE AND DETERMINE BURGERS IT SOLUTIONS THAT REDUCE A TOTAL BETA PHASE MISORIENTATION

708 — REFINE DETERMINATION OF THE BURGERS IT SOLUTIONS THAT REDUCES THE TOTAL BETA PHASE MISORIENTATION

710 — PERTURB THE VALUE OF THIRD EULER ANGLE AND REFINE DETERMINATION OF THE BURGERS IT SOLUTIONS THAT REDUCES THE TOTAL BETA PHASE MISORIENTATION

712 — DETERMINE THIRD EULER ANGLES

714 — DETERMINE AN MTR BASED ON THE CORRECTED ALPHA PHASE DATA SET

FIG. 7

| First Alpha grain | Second Alpha grain | Variant |
|---|---|---|
| 1002 | 1002 | 1 |
| 1004 | 1002 | 2 |
| 1008 | 1002 | 3 |
| 1002 | 1004 | 4 |
| 1004 | 1004 | 5 |
| 1008 | 1004 | 6 |
| 1002 | 1008 | 7 |
| 1004 | 1008 | 8 |
| 1008 | 1008 | 9 |

FIG. 10

Fig. 2. Graphical representation of inverse transformation solutions: (a) $T^\alpha = D^{-1}E^\alpha$, (b) $T^\alpha = D^{-1}C^1_{3+x}$, (c) $T^\alpha = D^{-1}C^2_{3+x}$, (d) $T^\alpha = D^{-1}C^3_{3+x}$, (e) $T^\alpha = D^{-1}C^1_{3-x}$, and (f) $T^\alpha = D^{-1}C^2_{3-x}$.

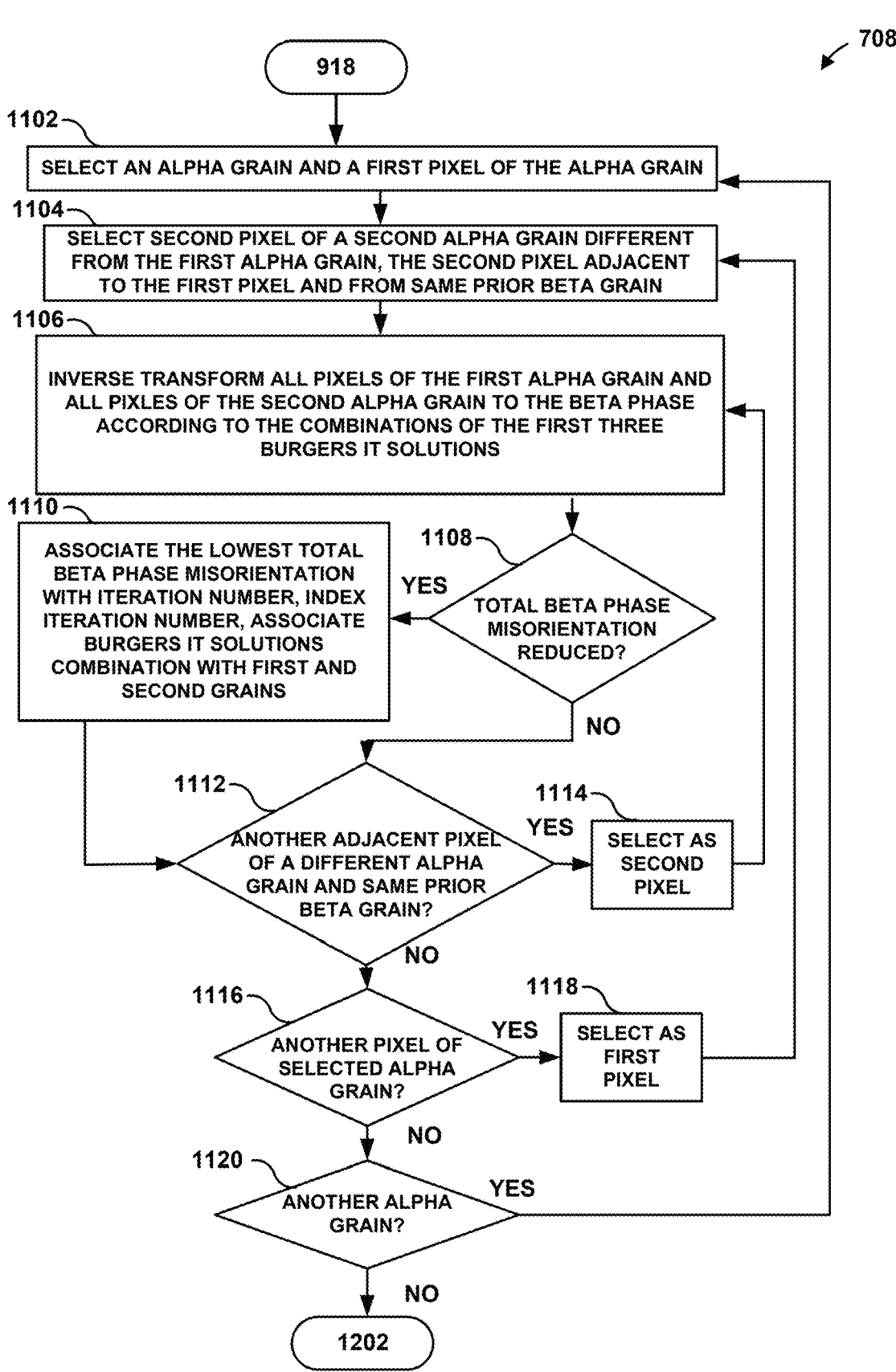

708

918

1102 — SELECT AN ALPHA GRAIN AND A FIRST PIXEL OF THE ALPHA GRAIN

1104 — SELECT SECOND PIXEL OF A SECOND ALPHA GRAIN DIFFERENT FROM THE FIRST ALPHA GRAIN, THE SECOND PIXEL ADJACENT TO THE FIRST PIXEL AND FROM SAME PRIOR BETA GRAIN

1106 — INVERSE TRANSFORM ALL PIXELS OF THE FIRST ALPHA GRAIN AND ALL PIXLES OF THE SECOND ALPHA GRAIN TO THE BETA PHASE ACCORDING TO THE COMBINATIONS OF THE FIRST THREE BURGERS IT SOLUTIONS

1110 — ASSOCIATE THE LOWEST TOTAL BETA PHASE MISORIENTATION WITH ITERATION NUMBER, INDEX ITERATION NUMBER, ASSOCIATE BURGERS IT SOLUTIONS COMBINATION WITH FIRST AND SECOND GRAINS

1108 — TOTAL BETA PHASE MISORIENTATION REDUCED?    YES    NO

1112 — ANOTHER ADJACENT PIXEL OF A DIFFERENT ALPHA GRAIN AND SAME PRIOR BETA GRAIN?    YES

1114 — SELECT AS SECOND PIXEL

NO

1116 — ANOTHER PIXEL OF SELECTED ALPHA GRAIN?    YES

1118 — SELECT AS FIRST PIXEL

NO

1120 — ANOTHER ALPHA GRAIN?    YES

$$g(\varphi_1, \Phi, \varphi_2) = \begin{bmatrix} cos\varphi_1 cos\varphi_2 - sin\varphi_1 sin\varphi_2 cos\Phi & sin\varphi_1 cos\varphi_2 + sin\varphi_1 cos\varphi_2 cos\Phi & sin\varphi_2 sin\Phi \\ -cos\varphi_1 sin\varphi_2 - sin\varphi_1 cos\varphi_2 cos\Phi & -sin\varphi_1 sin\varphi_2 + sin\varphi_1 sin\varphi_2 cos\Phi & cos\varphi_2 sin\Phi \\ sin\varphi_1 sin\Phi & -cos\varphi_1 sin\Phi & cos\Phi \end{bmatrix}$$

$$g(\varphi_1, \Phi, \varphi_2) = \begin{bmatrix} a_{11} & a_{12} & a_{13} \\ a_{21} & a_{22} & a_{23} \\ a_{31} & a_{32} & a_{33} \end{bmatrix} \begin{array}{l} \longrightarrow [1\,0\,0] = x' \\ \longrightarrow [0\,1\,0] = y' \\ \longrightarrow [0\,0\,1] = z' \end{array}$$

| Misorientation | Angle (°) | h | k | i | L |
|---|---|---|---|---|---|
| 1 | 10.23 | 0 | 0 | 0 | 1 |
| 2 | 60 | -1 | 2 | -1 | 0 |
| 3 | 60.83 | -12 | 7 | 5 | 3 |
| 4 | 63.26 | -2 | 1 | 1 | 1 |
| 5 | 90 | -7 | 12 | -5 | 0 |

FIG. 19

$\{110\}_\beta \,//\, (0001)_\alpha$ ➡ $(110)_\beta$ Beta Pole figure should look like $(0001)_\alpha$ Alpha Pole figure

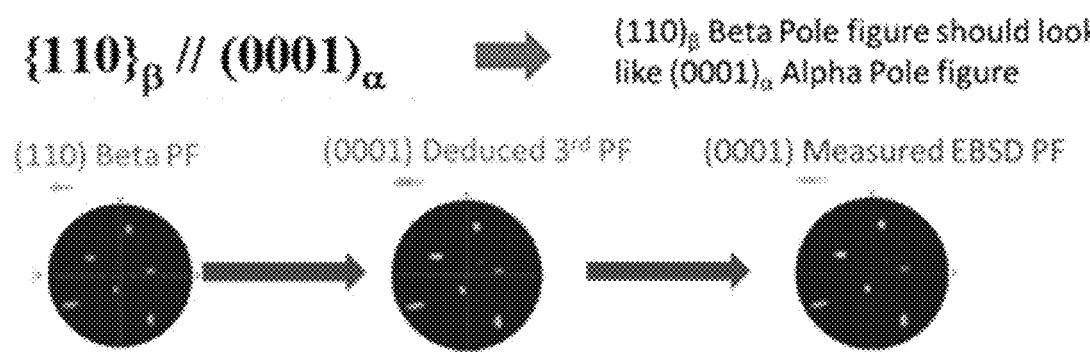

(110) Beta PF     (0001) Deduced 3ʳᵈ PF     (0001) Measured EBSD PF

FIG. 20

$<111>_\beta \,//\, <2\text{-}1\text{-}1\,0>_\alpha$ ➡ $(111)_\beta$ Beta Pole figure should look like $(11\text{-}20)_\alpha$ Alpha Pole figure

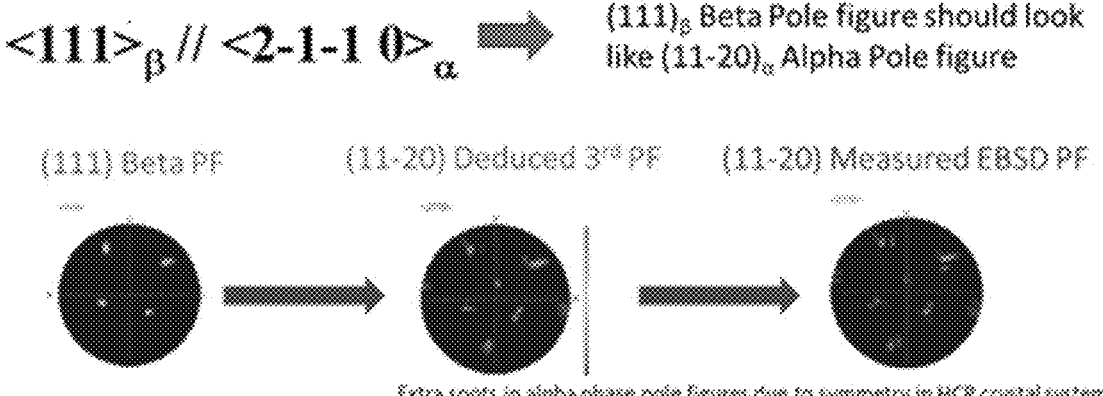

(111) Beta PF     (11-20) Deduced 3ʳᵈ PF     (11-20) Measured EBSD PF

Extra spots in alpha phase pole figures due to symmetry in HCP crystal system

FIG. 21

$$S_1^{Cubic} = \begin{bmatrix} 1 & 0 & 0 \\ 0 & 1 & 0 \\ 0 & 0 & 1 \end{bmatrix} \qquad S_9^{Cubic} = \begin{bmatrix} 0 & -1 & 0 \\ 0 & 0 & -1 \\ 1 & 0 & 0 \end{bmatrix} \qquad S_{17}^{Cubic} = \begin{bmatrix} 0 & 0 & 1 \\ -1 & 0 & 0 \\ 0 & -1 & 0 \end{bmatrix}$$

$$S_2^{Cubic} = \begin{bmatrix} 0 & 0 & 1 \\ 1 & 0 & 0 \\ 0 & 1 & 0 \end{bmatrix} \qquad S_{10}^{Cubic} = \begin{bmatrix} 0 & 1 & 0 \\ 0 & 0 & -1 \\ -1 & 0 & 0 \end{bmatrix} \qquad S_{18}^{Cubic} = \begin{bmatrix} -1 & 0 & 0 \\ 0 & 1 & 0 \\ 0 & 0 & -1 \end{bmatrix}$$

$$S_3^{Cubic} = \begin{bmatrix} 0 & 1 & 0 \\ 0 & 0 & 1 \\ 1 & 0 & 0 \end{bmatrix} \qquad S_{11}^{Cubic} = \begin{bmatrix} 0 & 0 & -1 \\ 1 & 0 & 0 \\ 0 & -1 & 0 \end{bmatrix} \qquad S_{19}^{Cubic} = \begin{bmatrix} -1 & 0 & 0 \\ 0 & -1 & 0 \\ 0 & 0 & 1 \end{bmatrix}$$

$$S_4^{Cubic} = \begin{bmatrix} 0 & -1 & 0 \\ 0 & 0 & 1 \\ -1 & 0 & 0 \end{bmatrix} \qquad S_{12}^{Cubic} = \begin{bmatrix} 0 & 0 & -1 \\ -1 & 0 & 0 \\ 0 & 1 & 0 \end{bmatrix} \qquad S_{20}^{Cubic} = \begin{bmatrix} 1 & 0 & 0 \\ 0 & -1 & 0 \\ 0 & 0 & -1 \end{bmatrix}$$

$$S_5^{Cubic} = \begin{bmatrix} -1 & 0 & 0 \\ 0 & -1 & 0 \\ 0 & 0 & -1 \end{bmatrix} \qquad S_{13}^{Cubic} = \begin{bmatrix} 0 & 0 & -1 \\ 0 & 1 & 0 \\ 1 & 0 & 0 \end{bmatrix} \qquad S_{21}^{Cubic} = \begin{bmatrix} 0 & 0 & 1 \\ 0 & 1 & 0 \\ -1 & 0 & 0 \end{bmatrix}$$

$$S_6^{Cubic} = \begin{bmatrix} 1 & 0 & 0 \\ 0 & 0 & -1 \\ 0 & 1 & 0 \end{bmatrix} \qquad S_{14}^{Cubic} = \begin{bmatrix} 1 & 0 & 0 \\ 0 & 0 & 1 \\ 0 & -1 & 0 \end{bmatrix} \qquad S_{22}^{Cubic} = \begin{bmatrix} 0 & -1 & 0 \\ 1 & 0 & 0 \\ 0 & 0 & 1 \end{bmatrix}$$

$$S_7^{Cubic} = \begin{bmatrix} 0 & 1 & 0 \\ -1 & 0 & 0 \\ 0 & 0 & 1 \end{bmatrix} \qquad S_{15}^{Cubic} = \begin{bmatrix} 0 & 1 & 0 \\ 1 & 0 & 0 \\ 0 & 0 & -1 \end{bmatrix} \qquad S_{23}^{Cubic} = \begin{bmatrix} -1 & 0 & 0 \\ 0 & 0 & 1 \\ 0 & 1 & 0 \end{bmatrix}$$

$$S_8^{Cubic} = \begin{bmatrix} 0 & 0 & 1 \\ 0 & -1 & 0 \\ 1 & 0 & 0 \end{bmatrix} \qquad S_{16}^{Cubic} = \begin{bmatrix} 0 & -1 & 1 \\ -1 & 0 & 0 \\ 0 & 0 & -1 \end{bmatrix} \qquad S_{24}^{Cubic} = \begin{bmatrix} 1 & 0 & 0 \\ 0 & 0 & -1 \\ 0 & -1 & 0 \end{bmatrix}$$

FIG. 27

$$S_1^{Hex} = \begin{bmatrix} 1 & 0 & 0 \\ 0 & 1 & 0 \\ 0 & 0 & 1 \end{bmatrix}$$

$$S_5^{Hex} = \begin{bmatrix} 1/2 & -\sqrt{3}/2 & 0 \\ -\sqrt{3}/2 & 1/2 & 0 \\ 0 & 0 & 1 \end{bmatrix}$$

$$S_9^{Hex} = \begin{bmatrix} -1/2 & -\sqrt{3}/2 & 0 \\ \sqrt{3}/2 & -1/2 & 0 \\ 0 & 0 & 1 \end{bmatrix}$$

$$S_2^{Hex} = \begin{bmatrix} -1 & 0 & 0 \\ 0 & -1 & 0 \\ 0 & 0 & 1 \end{bmatrix}$$

$$S_6^{Hex} = \begin{bmatrix} 1/2 & \sqrt{3}/2 & 0 \\ -\sqrt{3}/2 & 1/2 & 0 \\ 0 & 0 & 1 \end{bmatrix}$$

$$S_{10}^{Hex} = \begin{bmatrix} -1/2 & \sqrt{3}/2 & 0 \\ -\sqrt{3}/2 & -1/2 & 0 \\ 0 & 0 & 1 \end{bmatrix}$$

$$S_3^{Hex} = \begin{bmatrix} 1 & 0 & 0 \\ 0 & -1 & 0 \\ 0 & 0 & 1 \end{bmatrix}$$

$$S_7^{Hex} = \begin{bmatrix} -1/2 & \sqrt{3}/2 & 0 \\ \sqrt{3}/2 & 1/2 & 0 \\ 0 & 0 & 1 \end{bmatrix}$$

$$S_{11}^{Hex} = \begin{bmatrix} 1/2 & \sqrt{3}/2 & 0 \\ \sqrt{3}/2 & -1/2 & 0 \\ 0 & 0 & 1 \end{bmatrix}$$

$$S_4^{Hex} = \begin{bmatrix} -1 & 0 & 0 \\ 0 & 1 & 0 \\ 0 & 0 & 1 \end{bmatrix}$$

$$S_8^{Hex} = \begin{bmatrix} 1/2 & -\sqrt{3}/2 & 0 \\ -\sqrt{3}/2 & -1/2 & 0 \\ 0 & 0 & 1 \end{bmatrix}$$

$$S_{12}^{Hex} = \begin{bmatrix} -1/2 & -\sqrt{3}/2 & 0 \\ -\sqrt{3}/2 & 1/2 & 0 \\ 0 & 0 & 1 \end{bmatrix}$$

FIG. 28

MEASUREMENT AND DETERMINATION OF CRYSTALLOGRAPHIC TEXTURE WITH RESPECT TO POSITION

GOVERNMENT RIGHTS

This invention was made with Government support under contract number FA8650-17-2-5266; SUB: FA8650-20-2-5224. The Government has certain rights in this invention.

TECHNICAL FIELD

This disclosure relates to determining the local crystallographic texture of a polycrystalline material.

BACKGROUND

Components of high-temperature mechanical systems, such as gas-turbine engines, operate in severe environments. Some components may be formed of a metal or metal alloy, such as, for example, titanium or a titanium alloy. Other components may be formed of a ceramic or a composite material.

Mechanical properties of a material may depend at least in part on the microstructure of the material, including a presence or absence of defects, such as holes, voids or sections with a different chemical composition or phase constitution, within the material. For this reason, knowledge of the presence or absence of defects in the material may be desired before utilizing the material in a component, such as a gas turbine engine component.

SUMMARY

In general, this disclosure describes techniques for determining a crystalline structure of a material based on measurements including missing and/or erroneous data. More particularly, this disclosure describes techniques and devices for determining third Euler angles with improved accuracy based on measurement data sets including first and second Euler angles and missing and/or erroneous third Euler angles.

In one example, this disclosure describes a method including: measuring, by at least one of a polarized light device, a spatially resolved acoustic spectroscopy device, or an eddy current device, an alpha phase data set indicative of an alpha phase of a crystalline structure of a material; receiving, by processing circuitry, the alpha phase data set, wherein the alpha phase data set comprises a plurality of pixels, wherein each pixel of the plurality of pixels includes a position, a first Euler angle ($\varphi$1), a second Euler angle ($\Phi$), and a third Euler angle ($\varphi$2), wherein the third Euler angle ($\varphi$2), is missing or erroneous; adjusting, by the processing circuitry, the third Euler angle ($\varphi$2), of a pixel of the plurality of pixels; and storing, by the processing circuitry and based on adjusting the third Euler angle ($\varphi$2), of the pixel reducing a total beta phase misorientation, the alpha phase data set.

In another example, this disclosure describes a device including: a measurement device configured to measure a crystalline structure of a material and output an alpha phase data set indicative of the measurement of the crystalline structure; a memory; and one or more processors implemented in circuitry and in communication with the memory, the one or more processors configured to: receive the alpha phase data set, wherein the alpha phase data set comprises a plurality of pixels, wherein each pixel of the plurality of pixels includes a position, a first Euler angle ($\varphi$1), a second Euler angle ($\Phi$), and a third Euler angle ($\varphi$2), wherein the third Euler angle ($\varphi$2), is missing or erroneous; adjust the third Euler angle ($\varphi$2), of a pixel of the plurality of pixels; and store, and based on adjusting the third Euler angle ($\varphi$2) of the pixel reducing a total beta phase misorientation, the alpha phase data set.

In another example, this disclosure describes a non-transitory computer-readable storage medium having stored thereon instructions that, when executed, configure a processor to: receive an alpha phase data set, wherein the alpha phase data set comprises a plurality of pixels, wherein each pixel of the plurality of pixels includes a position, a first Euler angle ($\varphi$1), a second Euler angle ($\Phi$), and a third Euler angle ($\varphi$2), wherein the third Euler angle ($\varphi$2) is missing or erroneous; adjust the third Euler angle ($\varphi$2) of a pixel of the plurality of pixels; and store, based on adjusting the third Euler angle ($\varphi$2) of the pixel reducing a total beta phase misorientation, the alpha phase data set.

The details of one or more examples are set forth in the accompanying drawings and the description below. Other features, objects, and advantages will be apparent from the description and drawings, and from the claims.

BRIEF DESCRIPTION OF DRAWINGS

The patent or application file contains at least one drawing executed in color. Copies of this patent or patent application publication with color drawing(s) will be provided by the Office upon request and payment of the necessary fee.

As the color drawings are being filed electronically, only one set of the drawings is submitted.

FIG. 1 is a block diagram illustrating an example of a system that may be used to determine microtexture regions (MTRs) and MTR size statistics within a sample.

FIG. 7 is a flow diagram of an example method of determining third Euler angles of a data set measured by a measurement device.

FIG. 10 is a schematic diagram illustrating the six unique Burgers IT solutions.

FIG. 11 is a flow diagram of an example method of refining selection of the first three Burgers IT solutions.

FIG. 17 illustrates an example rotation matrix which may be used to determine the crystal axes and specimen directions of a crystal relative to the specimen coordinate system.

FIG. 19 is a table of the misorientations and axis direction for alpha phase orientations from a single prior beta grain corresponding to the alpha phase data set of FIG. 18.

FIG. 20 is an illustration of an example correspondence of a deduced $(110)_\beta$ pole figure with $(0001)_\alpha$ third Euler angle deduced and measured pole figures.

FIG. 21 is an illustration of an example correspondence of the deduced $(111)_\beta$ pole figure with the $(11\text{-}20)_\alpha$ third Euler angle deduced and measured pole figures.

FIG. 27 is a table of example cubic symmetry operators.

FIG. 28 is a table of example hexagonal symmetry operators.

DETAILED DESCRIPTION

In general, the present disclosure is directed to systems, devices, and techniques for determining a structure, a crystalline structure, and/or a defect in a material and, optionally, determining an approximate size and/or shape of the crystalline structure and/or defect. The systems, devices, and techniques may determine which areas of a material include microtexture regions (MTRs) and may determine a crystalline orientation of MTRs and non-MTR areas.

MTRs are large regions of the microstructure in forged components that have the same crystal orientation. MTRs may originate from a billet used in a forging process and may flow like rivers along the plastic flow lines of the forging and may then be broken up into separate regions or areas. Characterizing MTRs in certain zirconium and titanium alloys, such as Ti-6Al-4V, is of interest in many industries, including the aerospace industry.

MTRs may be determined, measured, and/or characterized using electron backscatter diffraction (EBSD) via a scanning electron microscope (SEM). EBSD characterization produces a data set (e.g., a "data file") containing the two-dimensional positions, e.g., x and y coordinates, of a measurement location (which may be referred to as a "pixel") along with three Euler angles ($\varphi1$, $\Phi$, and $\varphi2$) that describe the crystal orientation at the location "x" and "y" in relation to a reference, or specimen, coordinate system.

An EBSD data set including three Euler angles at each of a plurality of (x, y) positions may be used to determine crystal orientation, and misorientations relative to other positions, and to cluster or segment the EBSD data set to describe a distribution of MTRs and MTR size statistics present in a forged product (e.g., mean, median, max and minimum MTR sizes). However, a challenge with using EBSD to measure and characterize MTRs is that MTRs in forged products may be larger than the practical measurement field of view of a SEM. For example, MTRs may span tens of millimeters (mm) in length in a billet product, whereas SEM may have a field of view that is much smaller than tens of millimeters. SEM may measure larger areas by translating the sample (or detectors) and stitching multiple measurements together, however, SEM is performed in a vacuum and SEM measurement areas are typically limited by the amount of translation available within the vacuum chamber, making SEM measurement of larger areas more difficult, time-consuming, and costly, if not impossible due to translation limitations.

Figure 29:
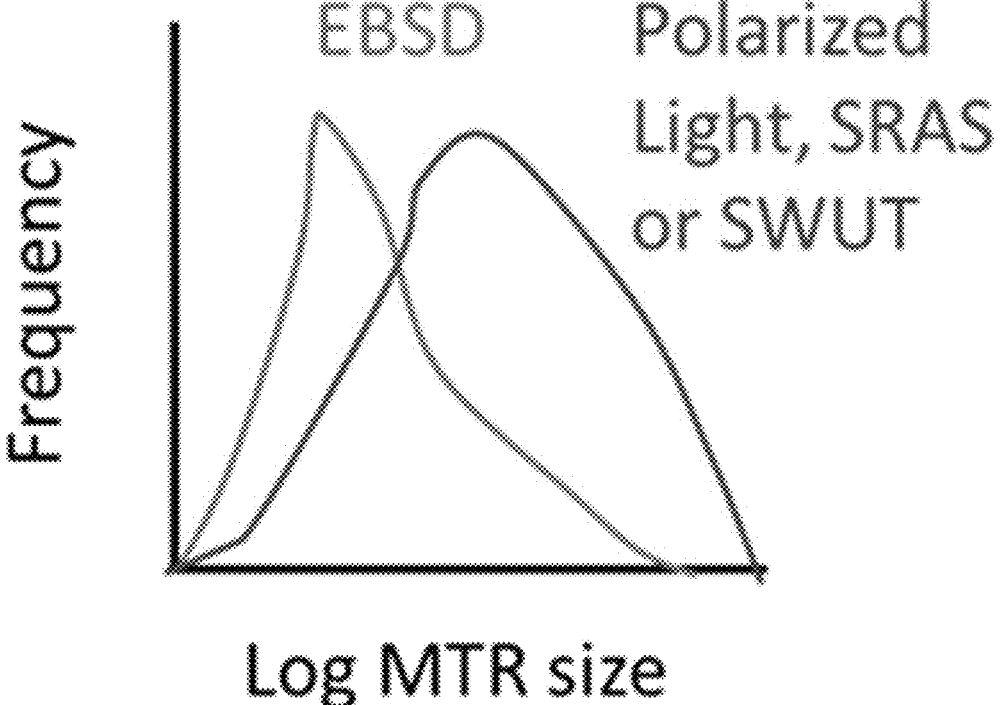
FIG. 29 is a plot comparing MTR size distribution of the same area of a material using EBSD versus other measurement techniques including missing and/or inaccurate third Euler angles.

For this reason, alternative measurement and characterization devices and techniques have been developed, for example, polarized light devices and techniques, spatially resolved acoustic spectroscopy (SRAS), and eddy current devices and techniques. However, alternative measurement and characterization devices and techniques do not have the ability to accurately determine the third Euler angle, e.g., $\varphi2$. As such, the alternative measurement and characterization devices and techniques are not able to differentiate at least certain orientations of crystals, which may preclude accurate determination of MTRs and MTR statistics. For example, alternative measurement and characterization devices and techniques cannot distinguish between two crystals that have their c-axis perfectly aligned, but are rotated about their c-axis, because of inaccurate measurements of the third Euler angle $\varphi2$. Additionally, for more complicated misorientations (e.g., between two crystals) the contribution of the third Euler angle $\varphi2$ on the mis-orientation cannot be determined. FIG. 29 is a plot comparing MTR size distribution of the same area of a material using EBSD versus other measurement techniques including missing and/or inaccurate third Euler angles.

In accordance with the systems, devices, and techniques described herein, a method of determining MTRs and MTR size statistics, via determining the third Euler angle ($\varphi2$) from data sets of alternative measurements (e.g., alternative to EBSD) having inaccurate, or missing, third Euler angle ($\varphi2$) data, includes measuring an alpha phase data set indicative of an alpha phase of a crystalline structure of a material, such as Ti-6Al-4V. The measurement device may be a device that outputs the alpha phase data set with missing and/or erroneous third Euler angles. Processing circuitry, such as an analysis module, may be configured to receive the alpha phase data set, the alpha phase data set including a plurality of pixels, each pixel including a position, first Euler angles ($\varphi 1$), second Euler angles D, and missing and/or erroneous third Euler angles ($\varphi 2$). The processing circuitry may be configured to adjust the third Euler angle ($\varphi 2$) of the pixels, e.g., to correct the third Euler angle ($\varphi 2$) of the pixels, and store the alpha phase data set, e.g., for further processing. In some examples, the processing circuitry may be configured to determine, subsequent to changing the value of the third Euler angle ($\varphi 2$) of the pixels, at least one microtexture region (MTR) based on the alpha phase data set, output an alert based on determining the at least one MTR, determine a status of a component made of the material, e.g., a blade of a gas turbine engine, based on at least one of the alpha phase data set or the at least one MTR, and output the status of the blade, e.g., to another device and/or a display.

Example devices, systems, and methods described herein may provide several benefits and/or advantages. For example, the systems and techniques may improve the accuracy of measurements of materials with areas large enough to include MTRs, the improvement in accuracy enabling determination of the presence and size statistics of MTRs based on data sets having a large enough field of view and/or measurement area but including missing or erroneous data. The systems and techniques may provide lower cost alternatives, e.g., relative to EBSD, which may increase measurement and characterization of potential defects and improve performance of devices utilizing such materials.

FIG. 1 is a block diagram illustrating an example of a system 10 that may be used to determine MTRs and MTR size statistics within sample 16. System 10 includes a data analysis device 12 and measurement device 14. Measurement device 14 is configured to measure a first surface 22 of sample 16.

Sample 16 may be any material, including, for example, a ceramic, a metal or a metal alloy, or a composite material. For example, sample 16 may include an alloy used in a high temperature mechanical system, such as a blade, or other component, of a gas turbine engine. Such alloys include titanium-based, nickel-based, magnesium-based or zirconium-based superalloys, e.g., Ti-6Al-4V, Ti-6242, Ti-17, Ti-6Al, Zr-2.5% Nb, Zircalloy, or the like.

Figure 2:
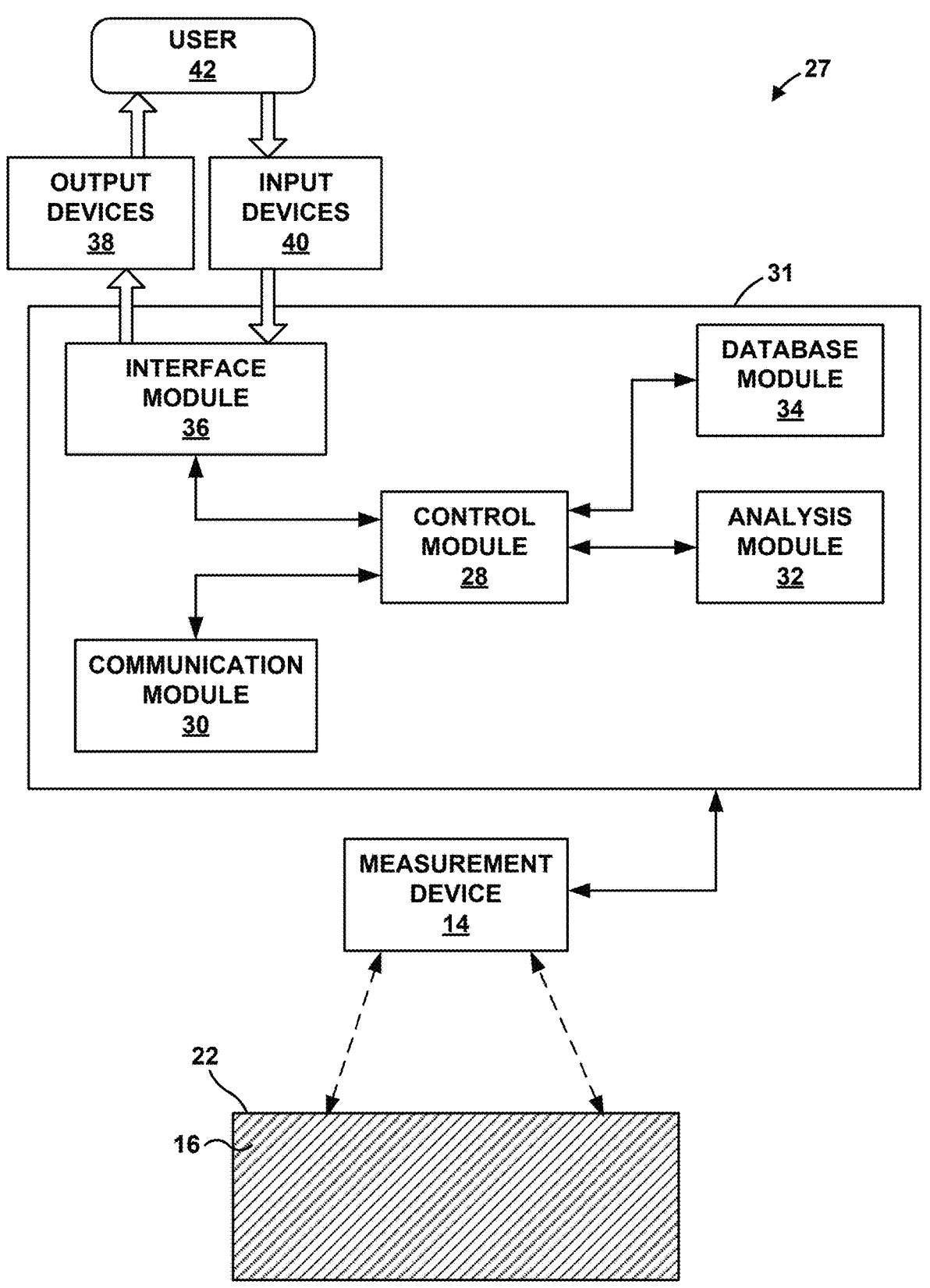
FIG. 2 is a functional block diagram illustrating another example of a system which may be used to determine MTRs and MTR size statistics within sample.
Figure 3:
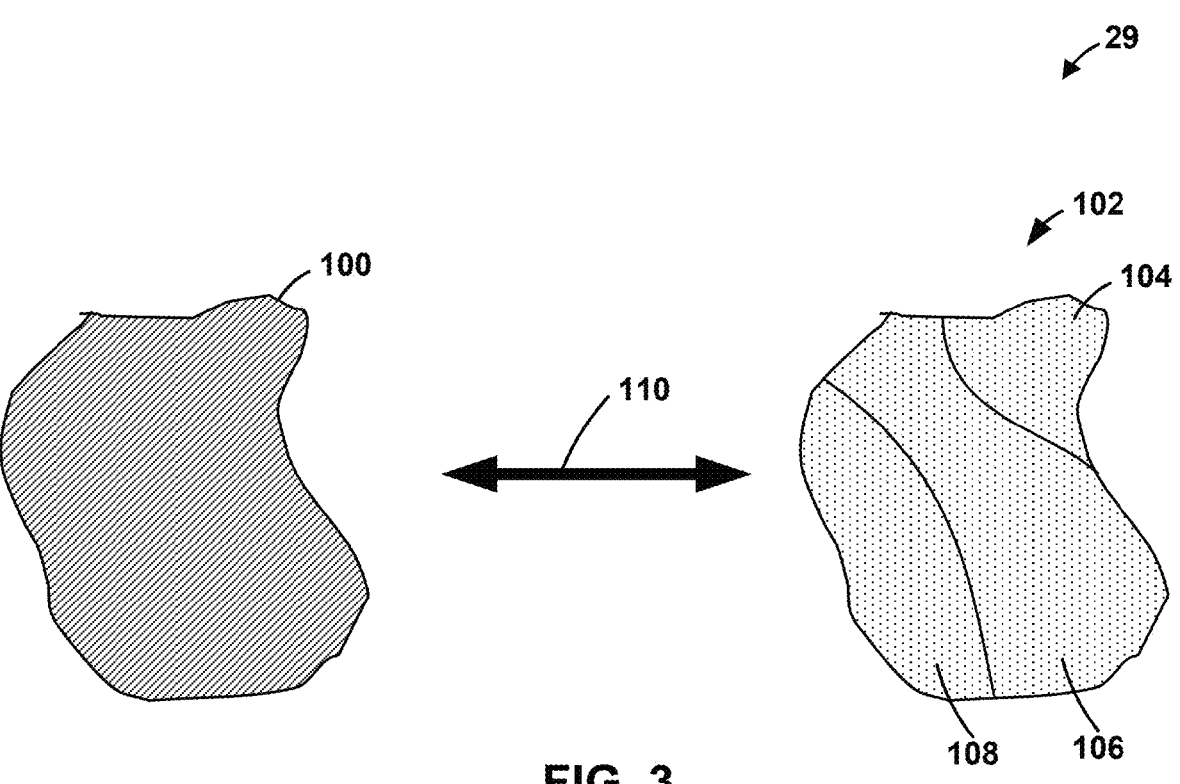
FIG. 3 is a schematic representation of an example transformation between a beta phase grain and a plurality of alpha phase grains of a material.

System 10 may be utilized to detect the presence of one or more MTRs and MTR size statistics of the one or more MTRs. In some examples, system 10 may determine whether the one or more MTRs may be characterized as a defect or defects within sample 16. In some examples, system 10 may allow determination of the approximate size and/or shape of one or more MTRs, and may additionally or alternatively facilitate determination of locations of the one or more MTRs within sample 16. System 10 includes data analysis device 12, which controls operation of system 10 automatically or under control of a user 42 (FIGS. 2 and 3).

Data analysis device 12 may be a general-purpose workstation, desktop computer, laptop computer, a handheld computing device, a personal digital assistant (PDA), or other computing device. Data analysis device 12 may include a microprocessor, digital signal processor (DSP), field programmable gate array (FPGA), application specific integrated circuit (ASIC) or other hardware, firmware and/or software for implementing the techniques described in this disclosure. In other words, the control of system 10 and analysis of data sets, as described herein, may be implemented in hardware, software, firmware, combinations thereof, or the like. If implemented in software, a computer-readable medium may store instructions, i.e., program code, that can be executed by a processor or DSP to carry out one or more of the techniques described herein. For example, the computer-readable medium may comprise magnetic media, optical media, random access memory (RAM), read-only memory (ROM), non-volatile random access memory (NVRAM), electrically erasable programmable read-only memory (EEPROM), magnetoresistive random access memory (MRAM), flash memory, or other media suitable for storing program code.

Data analysis device 12 controls operation of measurement device 14 and receives from measurement device 14 signals representative of the positions and Euler angles ($\varphi 1$, $\Phi$, and $\varphi 2$) measured and/or detected by measurement device 14.

Measurement device 14 may be configured to measure a two-dimensional area of sample 16 at surface 22 and output a data set, or "image" of the structure sample 16, e.g., the crystalline structure and crystalline orientation of sample 16. Measurement device 14 may output an "image" where each x-y location, or "pixel," of the image includes a set of three Euler angles ($\varphi 1$, $\Phi$, and $\varphi 2$) measured by measurement device 14. Each pixel may represent a crystal, or a portion of a crystal, of sample 16 at the pixel location, e.g., the crystalline structure of sample 16 at the pixel location. In some examples, measurement device 14 may by a polarized light measurement device, a SRAS measurement device, an eddy current measurement device, or the like. In some examples, measurement device 14 may measure, and output, a data set or image of Euler angles ($\varphi 1$, $\Phi$, $\varphi 2$) in which the third Euler angle, $\varphi 2$, is inaccurate, erroneous, or missing. In some examples, measurement device 14 may be configured to measure an area of surface 22 of sample 16 that is relatively small (e.g., 5 mm×5 mm) to something extremely large (1 meter×1 meter, or larger) through the stitching of data from smaller fields of view together. For example, measurement device 14 may not need to be performed under vacuum, and may not be limited by a vacuum chamber, e.g., in translating sample 16 or detectors of measurement device 14.

In some examples, one or more processors, or processing circuitry, of data analysis device 12 may be configured to control the measurement device 14 to measure an area of a surface of a material, e.g., area 650 (FIG. 5B) of surface 22 of sample 16 (FIG. 2). The measurement may yield a data set including information indicative of an alpha phase of a hexagonally close packed (hcp) crystalline structure and/or orientation of sample 16, e.g., Euler angles ($\varphi 1$, $\Phi$, and $\varphi 2$). The measurement device and/or technique may yield a data set including missing and/or erroneous information, e.g., missing and/or erroneous third Euler angles ($\varphi 2$). For example, the measurement device may be a polarized light device, a spatially resolved acoustic spectroscopy device, or an eddy current device.

In some examples, the alpha phase data set may include a plurality of pixels, each including information such as the Euler angles as a function of position. The processing circuitry may be configured to receive the alpha phase data set, and to adjust the third Euler angles ($\varphi 2$) of pixels of the data set, e.g., to correct the third Euler angle ($\varphi 2$) of the pixels, and store the alpha phase data set, e.g., for further processing. In some examples, the processing circuitry may be configured to determine, subsequent to changing the value of the third Euler angle ($\varphi2$) of the pixels, at least one microtexture region (MTR) based on the alpha phase data set, output an alert based on determining the at least one MTR, determine a status of a component made of the material, e.g., a blade of a gas turbine engine, based on at least one of the alpha phase data set or the at least one MTR, and output the status of the blade, e.g., to another device and/or a display.

FIG. 2 is a functional block diagram illustrating an example of a system 10 which may be used to determine MTRs and MTR size statistics within sample 16. In the example illustrated in FIG. 2, system 27 includes measurement device 14 and a data analysis device 31. Data analysis device 31 includes a control module 28, a communication module 30, an analysis module 32, a database module 34, and an interface module 36. Data analysis device 31 may be substantially similar to data analysis device 12 of FIG. 1, except for the differences described herein.

Interface module 36 represents software and hardware necessary for interacting with a user, e.g., for receiving input from a user 42 and for outputting information to the user 42. Interface module 36 may receive input from input devices 40 and output data to output devices 38 that enable a user 42 to interact with data analysis device 12. For example, via interface module 36, user 42 may change operational parameters of data analysis device 12 and manipulate data stored in database module 34. Moreover, user 42 may interact with interface module 36 to initiate measurement of sample 16 to detect materials properties (e.g., crystal structure and orientations) and determine the presence of, and size statics of, MTRs. Further, user 42 may interact with data analysis device 12 to view and manipulate the acquired data via output devices 38 and input devices 40. During this process, interface module 36 may present a user 42 with user interface screens for interacting with analysis device 12. Exemplary input devices 40 include a keyboard, a touch screen, a mouse, a microphone, and the like. Output devices 38 may include, for example, an LCD screen, an LED array, a CRT screen, or a touch screen display.

Communication module 30 represents hardware and software necessary for communication between data analysis device 31 and another device, such as, for example, a device external to system 27, such as another computing device. The communication module 30 may include a single method or combination of methods to transfer data to and from data analysis device 31. Some methods may include a universal serial bus (USB) port, a PCI bus, or IEEE 1394 port for hardwire connectivity with high data transfer rates. In some examples, a storage device may be directly attached to one of these ports for data storage for post processing. The data may be pre-processed by control module 28 and/or analysis module 32 and ready for viewing, or the raw data may need to be completely processed before analyzing can begin.

Communication module 30 may also include radio frequency (RF) communication or a local area network (LAN) connection. Moreover, communication may be achieved by direct connection or through a network access point, such as a hub or router, which may support wired or wireless communications.

Control module 28 represents control logic that, in response to input received from user 42 via interface module 36, directs the operation of data analysis device 31 and measurement device 14. For example, control module 28 may comprise software instructions that, when executed, provide control logic for communicating commands to measurement device 14 to commence measurement and data collection via measurement device 14. Furthermore, control module 28 provides control logic for storing the collected data within database module 34, and for invoking analysis module 32 to process the data automatically or in response to commands from user 42.

Control module 28 may be configured to control measurement device 14 to generate and direct at least a portion of energy to sample 16 and first surface 22. For example, control module 28 may be configured to control measurement device 14 to generate and direct polarized light to first surface 22 for a polarized light measurement, or to generate and direct acoustic energy to and/or along first surface 22 for an SRAS measurement, or to generate and direct electrical energy to and/or along first surface 22 for an eddy current measurement.

Control module 28 may be configured to control measurement device 14 to detect and/or measure return energy from sample 16 and/or first surface 22, e.g., light (electromagnetic) energy, acoustic energy, and/or electrical current after having interacted with sample 16 and/or first surface 22, and to acquire one or more signals proportional to the detected/measured energy. Control module 28 and/or measurement device 14 may be configured to then generate a data set representative of the acquired signals, the data set representing detected/measured properties of sample 16 and/or first surface 22, e.g., Euler angles of the crystalline structure of sample 16 as a function of position of an area of first surface 22.

In some examples, the measured data sets, or "images," may be stored in database module 34. Database module 34 represents hardware and software necessary for storing and retrieving data, and may comprise, for example, a suitable magnetic media, optical media, random access memory (RAM), read-only memory (ROM), non-volatile random access memory (NVRAM), electrically erasable programmable read-only memory (EEPROM), flash memory, or other media suitable for storing program code and data. In some examples, control module 28 causes the data sets to be stored in database module 34 for later manipulation or may communicate the data sets to analysis module 32 for analysis according to one or more techniques described herein.

Analysis module 32 may be configured to receive the data sets from control module 28, to processes the data according to at least one of the techniques described herein, and to detect a presence of MTRs and size statistics of MTRs, automatically or in response to an instruction received from user 42. Analysis module 32 represents processing logic, processing circuitry, and/or control circuitry configured to process data sets according to the methods and techniques described herein. For example, analysis module 32 may comprise software instructions that, when executed, provide control logic for processing data sets and executing the methods and techniques described herein.

FIG. 3 is a schematic representation of a transformation between a beta phase grain 100 and a plurality of alpha phase grains 102 of a material. For example, a material that is heat treated above a beta transus temperature may have a beta phase crystalline structure at temperatures above the beta transus temperature, and the material may undergo a phase transformation to an alpha phase crystalline structure when cooling to a temperature below the beta transus temperature. The beta transus temperature of a material is the lowest temperature at which substantially all of the material is in the beta phase. The beta phase of a titanium alloy such as Ti-6Al-4V has a body-centered cubic (bcc) crystalline structure. The beta transus temperature may range from about 700 degrees Celsius (° C.) to about 1,050° C. The beta transus temperature of Ti-6Al-4V may be about 995° C. to about 1,000° C.

Above the beta transus temperature, the material may include a plurality of grains, or crystals, in the beta phase. Each grain comprises a volume of material having the same orientation of beta phase, e.g., a volume of material comprising a single crystal having a beta phase in a particular orientation. Different beta grains may have different orientations, and each beta grain may be referred to as a prior beta grain, e.g., in reference to the beta grain prior to undergoing a phase transformation from the beta phase to an alpha phase upon the material cooling below the beta transus temperature. For titanium alloys, the beta phase includes atoms in a body centered cubic (bec) lattice, and the alpha phase includes atoms in a hexagonally close packed (hcp) lattice.

Upon cooling below the beta transus temperature, each prior beta grain of an alloy, e.g., Ti-6Al-4V, may undergo a phase transformation to a plurality of alpha grains, e.g., a plurality of volumes having different orientations of an hcp lattice. In the example shown, prior beta grain 100 may undergo a phase transformation 110 to alpha phase material 102 including a plurality of alpha grains (alternatively referred to as alpha phase grains), e.g., alpha grains, 104, 106, 108. In some examples, less than all of a prior beta grain may transform to an alpha phase. For example, a portion of a prior beta grain may transform to a plurality of plurality of alpha grains, and a portion may remain in a beta phase. In some examples, about 95% of the material of a prior beta grain may transform, upon cooling below the beta transus temperature, to a plurality of alpha grains and about 5% may remain in the beta phase.

Figure 4:
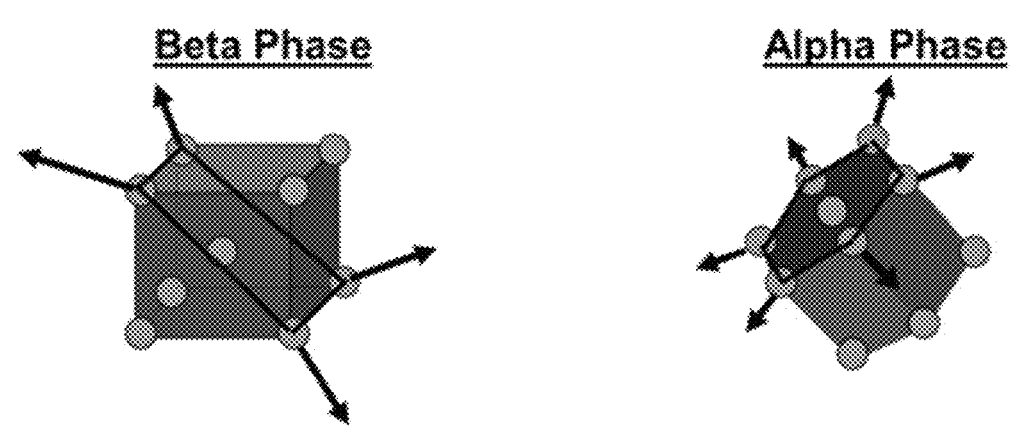
FIG. 4 is a schematic illustration of an example beta phase lattice and an example alpha phase lattice related through a Burgers orientation relationship.

FIG. 4 is a schematic illustration of a beta phase lattice 200 and an alpha phase lattice 202 related through a Burgers orientation relationship 210. Alpha and beta phase alloys, e.g., including titanium alloys such as Ti-6Al-4V, develop complex textures during thermomechanical processing due to the allotropic phase transformation between the beta and alpha phases. These phases are crystallographically related through the Burgers orientation relationship 210. In some examples, an alloy may undergo a phase transformation upon cooling from a beta phase to only a finite set of alpha phase orientations, e.g., a prior beta grain may not phase transform to any arbitrary alpha phase orientation because only a finite set of alpha phase orientations, e.g., variants, are thermodynamically allowed. For example, a body centered cubic prior beta grain 100 of a titanium alloy such as Ti-6Al-4V may transform to only twelve variants of a hexagonally close packed alpha phase.

The variants of alpha phase are related to the prior beta grain via the Burgers orientation relationship 210 such that the orientation of the prior beta grain 100 may be calculated based on a measured orientation of any one of the 12 alpha phase variants. For example, alpha grains 104, 106, and 108 are each a variant of an orientation of a hexagonally close packed crystal having an orientation related to the same prior beta grain 100. If the orientation of each of alpha grains 104, 106, and 108 are measured, e.g., via EBSD (which includes relatively accurate measurements of all three Euler angles), the orientation of prior beta grain 100 may be calculated based on any one of the measurements of alpha grains 104, 106, and 108 via Burgers orientation relationship 210. Calculation of a prior beta grain orientation from an orientation of an alpha grain and/or calculation of an orientation variant of an alpha grain from an orientation of a prior beta grain may be referred to herein as "transforming" between the prior beta grain and the alpha grains. If transformation to a prior beta grain from two different alpha grains results in different orientations of the prior beta grain, the two alpha grains did not originate from the same prior beta grain. Two different alpha grains may transform to the same prior beta grain with slightly different orientations, e.g., there may be small variations in the orientation calculated via Burgers orientation relationship 210 due to noise in measurements of the alpha phase variants.

Burgers orientation relationship 210 may be used to determine which data points (e.g., x-y positions) of a data set of alpha grain crystal orientations (e.g., the measured three Euler angles) originate from the same prior beta grain. For example, determining whether alpha phase data points originate from the same prior beta grain based on whether the orientations of the beta phase determined from the measured alpha phase data points match or are misoriented relative to each other. Determing whether certain data points of a measured alpha phase data set may be used to determine missing or inaccurate measurements of the alpha phase, e.g., to determine missing or inaccurate third Euler angles, as described further below. In examples described herein, a total amount of misorientation of the beta phase, e.g., integrated across a plurality of data points of a measured data set, may be used as a metric, or merit function, of a method or algorithm for determining missing and/or inaccurate third Euler angles of data sets measured by measurement device 14.

Figure 5A:
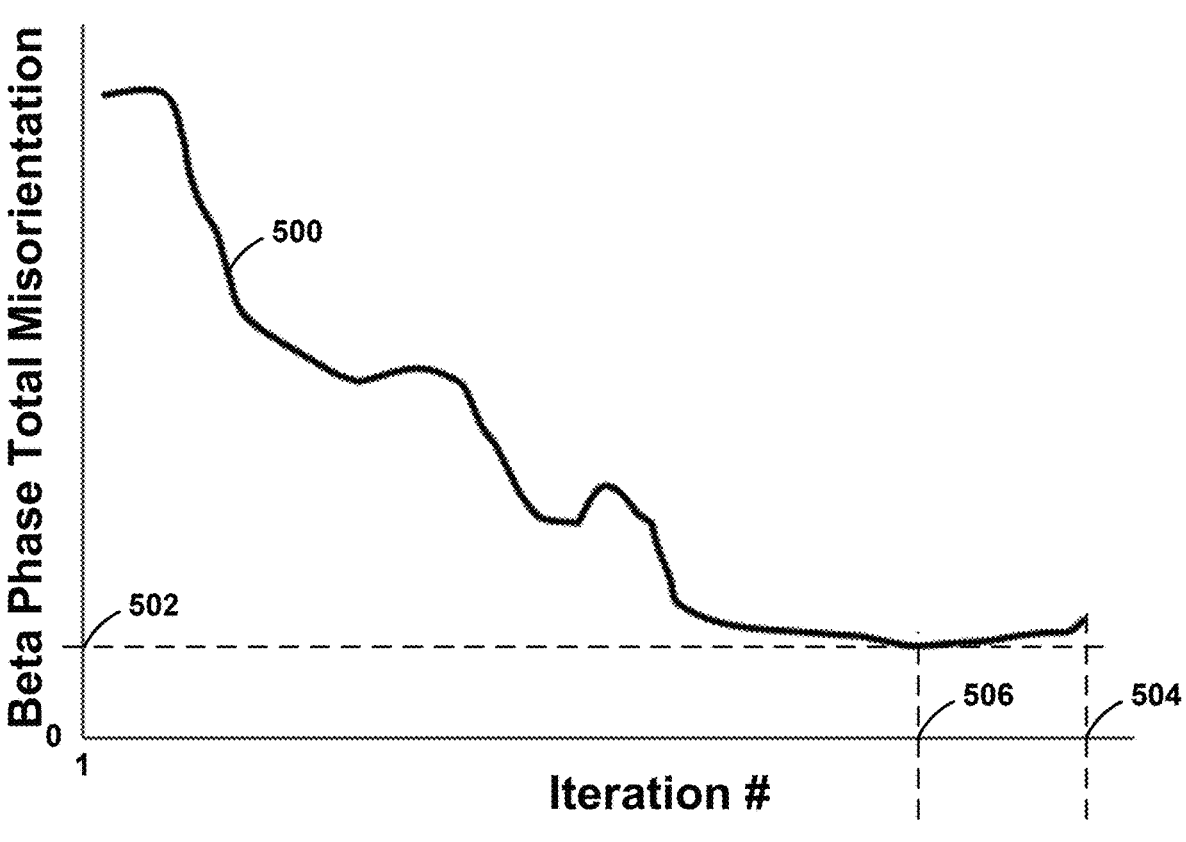
FIG. 5A is a plot of an example total beta phase misorientation curve as a function of iteration number of an iterative algorithm for determining third Euler angles from a data set of measured orientations of a material.

FIG. 5A is a plot of an example total beta phase misorientation curve 500 as a function of iteration number of an iterative algorithm for determining third Euler angles from a data set of measured orientations of a material. In the example shown, at iteration number 1, the total beta phase misorientation is high due to missing and/or inaccurate third Euler angles of the data set. For example, a user may cause measurement device 14 to measure a data set including an image of the crystal orientations of sample 22, the orientations being characterized by the three Euler angles, and where sample 22 may be an alloy such as Ti-6Al-4V. Data analysis device 12 may receive the data set and transform at least a portion of the data points to the beta phase, via Burgers orientation relationship 210, a total misorientation of the beta phase after transformation. Data analysis device 12 may then perform an iterative method (described further below) to refine the missing and/or inaccurate third Euler angles of the data set and transform at least a portion of the refined data set to the beta phase and determine the total misorientation of the beta phase. Data analysis device 12 may continue to perform the method until a stop condition is reached. The stop condition may be after execution of the method for a predetermined number of interations, after the total beta phase misorientation is less than or equal to a threshold value, or any other suitable stop condition.

Figure 5B:
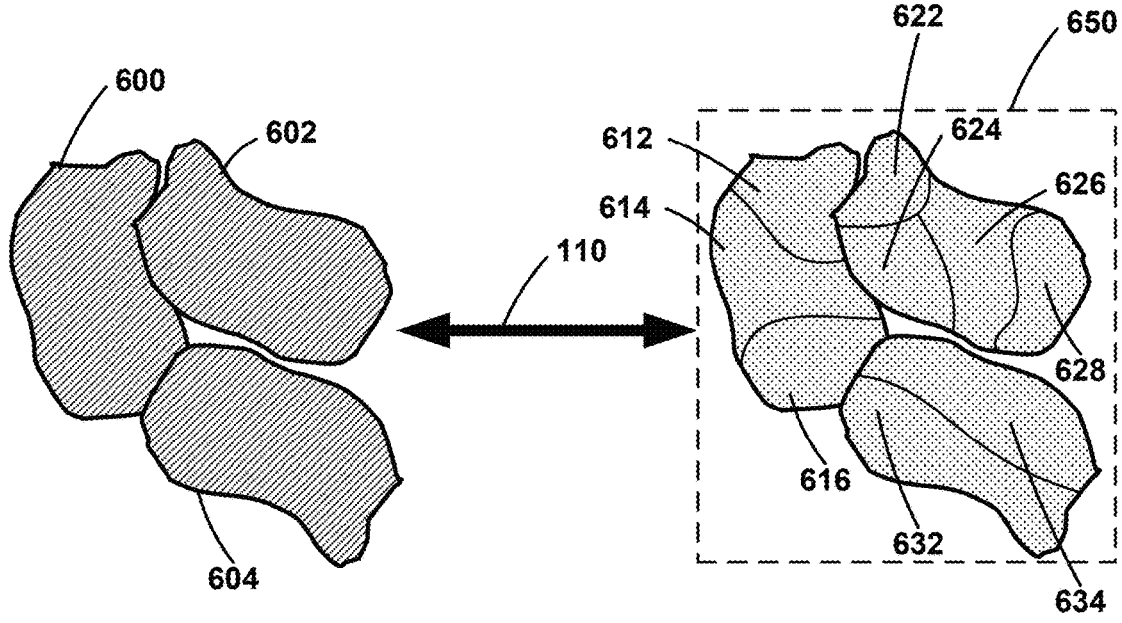
FIG. 5B is a schematic illustration of an example measurement area including a plurality of alpha phase grains after transforming from an example plurality of prior beta grains.

In the example shown, data analysis device 12 may iterate until iteration number 504. Beta phase misorientation curve 500 may have a minimum beta phase misorientation value 502 at iteration number 506. In some examples, if measurement device 14 measures a portion of sample 16 originating from a single prior beta grain, the minimum value 502 approaches zero. In other examples, if measurement device 14 measures a portion of sample 16 originating from a plurality of prior beta grains, the minimum value 502 approches a minimum asymptote value due to the prior beta grains having different orientations. For example, as shown in FIG. 5B, measurement device 14 may measure a data set of alpha phase orientations within area 650 of sample 16, e.g., area 650 including a plurality of alpha grains 612, 614, 616, 622, 624, 626, 628, 632, and 634 originating from prior beta grains 600, 602, and 604, and other alpha grains within area 650 originating from other prior beta grains (not shown). Data analysis device 12 may be configured to determine which data points of the data set correspond to which alpha grains 612-634 originated from which prior beta grains 600, 602, and 604 based at least in part on determining a minimum total beta phase misorientation value 502.

Figure 6A:
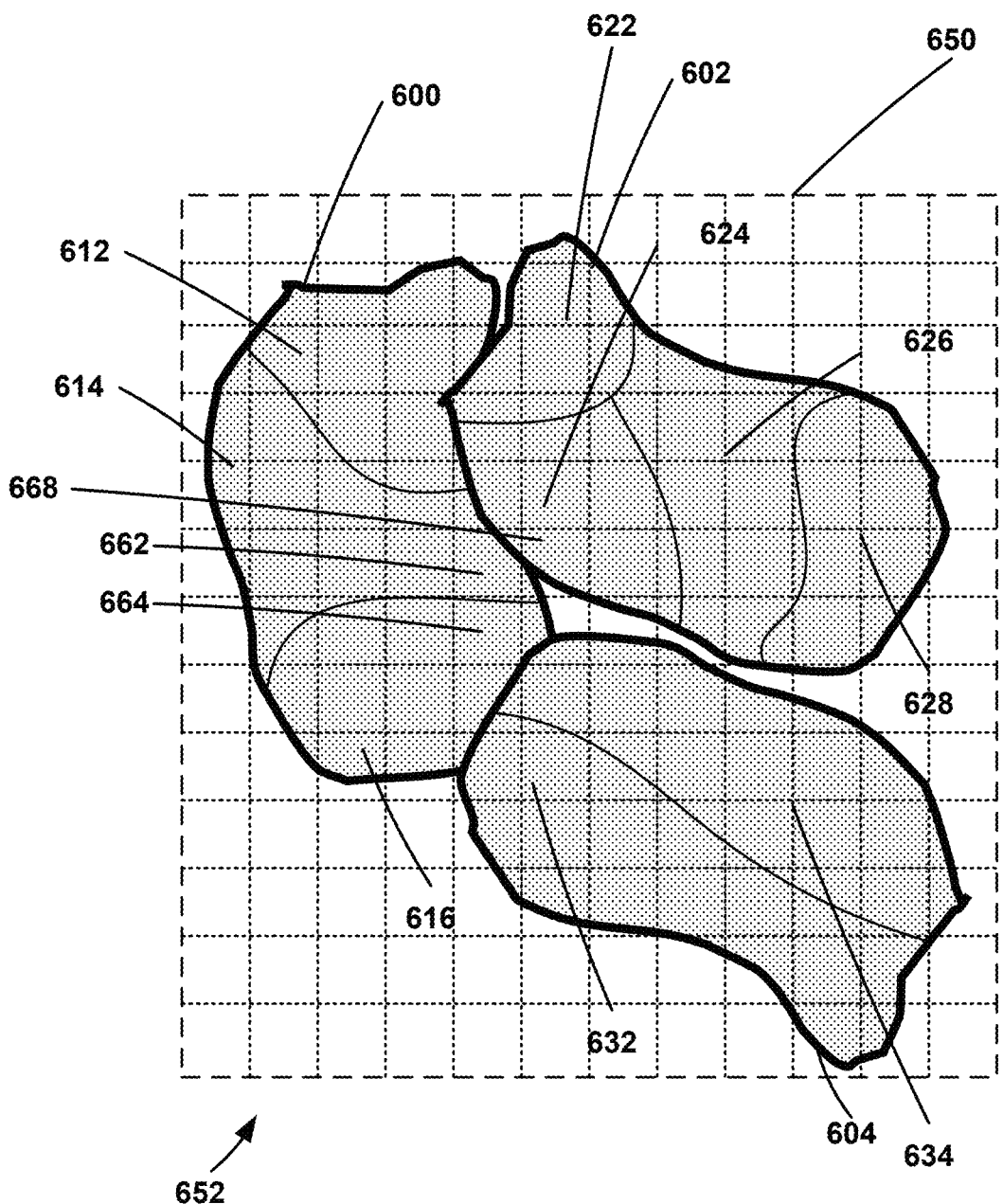
FIG. 6A is a schematic diagram illustrating an example measurement area of a measurement device.

FIG. 6A is a schematic diagram illustrating an example measurement area 650. For example, measurement device 14 may be configured to measure a plurality pixels (e.g., alpha data set 652) corresponding to a plurality of x-y positions of measurement area 650 corresonding to an "image" of the crystal orientations of sample 16. Each pixel of the plurality of pixels corresponding to the image of area 650 may include a vector of information, for example, each of three Euler angles, an x-position, and a y-position. The plurality of pixels, and information containered within each pixel, may alternatively be referred to as alpha phase data set 652 or alpha phase image 652.

Measurement device 14 may be configured to output alpha phase data set 652 to data analysis device 12 or 27, or alternatively measurement device 14 may be configured to output one or more signals indicative of the measurements corresponding to alpha phase data set 652 data analysis device 12 or 27 may form alpha phase data set 652 based on the one or more signals. Additionally, data analysis device 12, analysis device 12, or control module 28 may add information to data set 652, e.g., data analysis device 12 or 27 may determine the presence of, and which pixels are associated with, one or more alpha phase grains based on the x-y positions and Euler angles of the plurality of pixels, and may associate each pixel of the plurality of pixels with the one or more alpha grains. For example, data analysis device 12 or 31 may add an alpha grain identification (ID) value to the vector of information of each pixel.

In some examples, data analysis device 12 or 31 may determine which alpha phase grains may have originated from the same prior beta phase grain based on the x-y positions, Euler angles, and alpha grain IDs of the plurality of pixels, and may associate each pixel of the plurality of pixels with a prior beta grain. For example, data analysis device 12 or 31 may add a prior beta grain identification (ID) value to the vector of information of each pixel, and each pixel of data set 652 may include a vector of information including each of three Euler angles, an x-position, a y-position, an alpha grain ID, and a prior beta grain ID.

FIGS. 7-16 are flow diagrams of an example technique or techniques of determining third Euler angles (<φ2) of a measured data set including erroneos or missing third Euler angles, and determinining the presence and size statitstics of MTRs, and are described together below. FIG. 7 is a flow diagram of an example method which data analysis device 12 (or data analysis device 31) may perform to determine the third Euler angles of a data set measured by measurement device 14, which may in turn be used to determine the presence and size statistics of MTRs. FIG. 7 is described with concurrent reference to system 10 of FIG. 1 and system 27 of FIG. 2, although other systems may be used.

In some examples, the techniques or techniques of FIGS. 7-16 include determining, by control circuitry (e.g., analysis module 32), alpha phase grains and alpha phase grain boundaries of the measurement of sample 16 based on the x-y positions and first and second Euler angles (φ1, Φ), determining which alpha phases are from the same prior beta grains, and adjusting the third Euler angles (φ2) of the measurement based on reducing a total misorientation of the crystals of the prior beta grains.

Control module 28 may receive a data set 652 including a plurality of measured Euler angles at each of a plurality positions of sample 16 (700). For example, a user 42 may select a measurement option via input device 40 causing control module 28 to control measurement device 14 to measure sample 16 and output the measurement as a data set 652 including a plurality of measured Euler angles as a function of spatial position of a portion of the area of surface 22. In some examples, the alpha phase data set 652 may include a plurality of pixels arranged in a grid or an array as shown in FIG. 6. Each pixel of alpha phase data set 652 may include a vector of information including an x-position, a y-position, a first Euler angle (φ1), a second Euler angle (Φ), a third Euler angle (φ2) which may be erroneous or missing, an alpha grain ID which may initially be unknown, and a prior beta grain ID which may also initially be unknown. Control module 28 may invoke analysis module 32 to process the received alpha phase data set 652.

Analysis module 32 may zero the measured third Euler angle (φ2) values and determine the alpha grain IDs of each of the plurality of pixels (702). In some examples, measurement device 14 may be a polarized light measurement device or a SRAS measurement device and may output alpha phase data set 652 with third Euler angle (φ2) values already set to zero, and analysis device 32 may not need to zero the measured third Euler angle (φ2) values. In other examples, measurement device 14 may output alpha data set 652 without any measured third Euler angle (φ2) values, e.g., missing values, or with partially missing measured third Euler angle (φ2) values, with erroneous measured third Euler angle (φ2) values, or with partially missing and/or partially erroneous measured third Euler angle (φ2) values.

For example, analysis module 32 may replace the measured, and erroneous or missing, third Euler angle (φ2) value of each pixel with a zero value. Analysis module 32 may determine the alpha grain IDs of each of the plurality of pixels based on the x-y positions and first and second Euler angles (φ1, Φ) of the plurality of alpha phase data set 652 and replace and/or add the alpha grain ID value determined for each pixel. This work may be performed with an algorithm developed in MATLAB®, free-ware packages like DREAM3D, or bespoke codes that compare individual pixels and their relative misorientation to develop unique alpha phase grain ID's that correlate clusters of pixels to and ID number.

Analysis module 32 may determine which alpha grains may be from the same prior beta grain (704). Analysis module 32 may determine which pixels of alpha phase data set 652 may be from the same prior beta grain based on the first and second Euler angles (φ1, Φ) and the alpha grain IDs of each pixel of the plurality of pixels. For example, analysis module 32 may compare two adjacent (e.g., touching) pixels from different alpha grains and having different alpha grain ID values, such as pixels 662 and 664 of FIG. 6A.

Figure 6B:
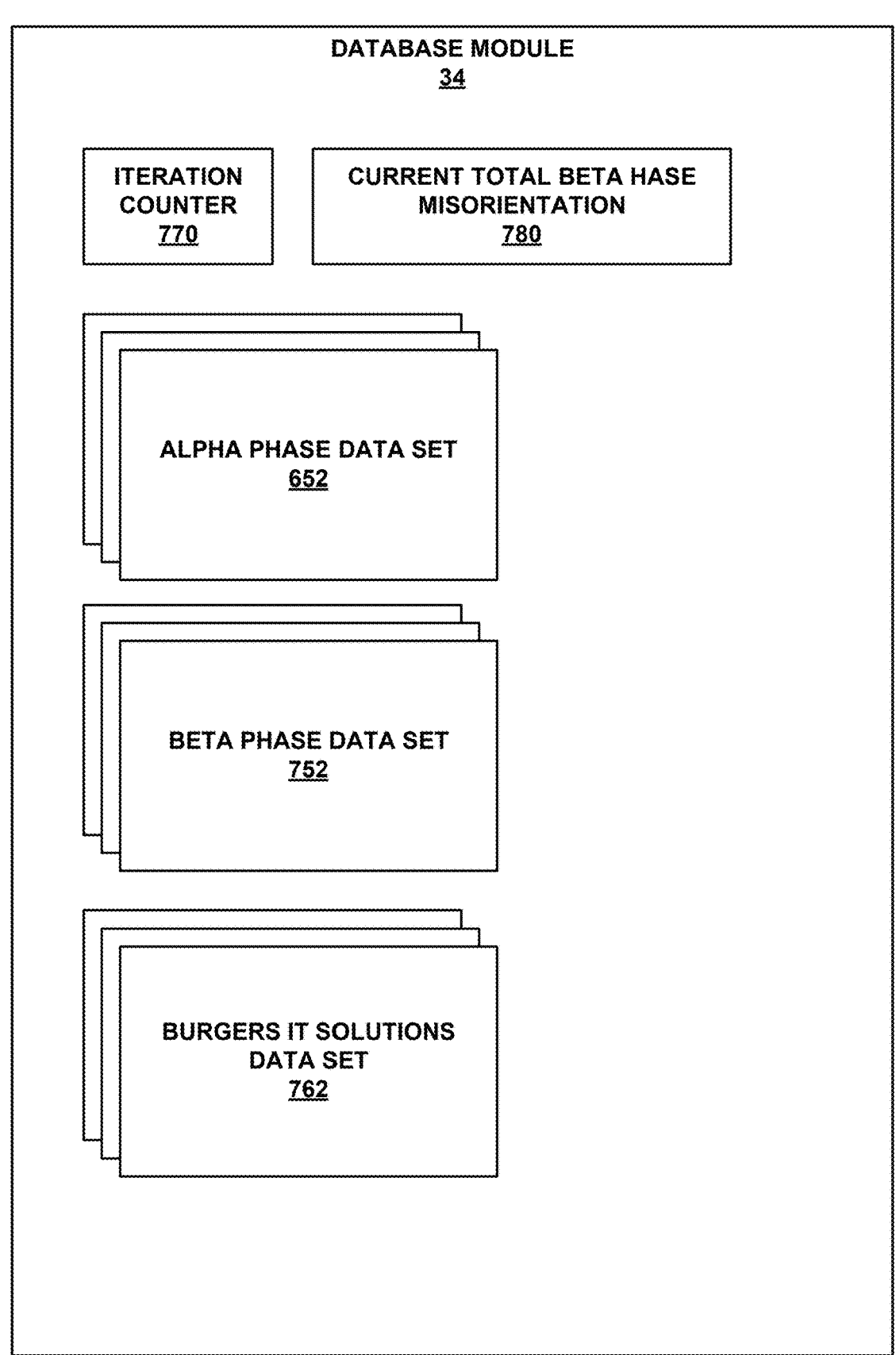
FIG. 6B is a schematic diagram of an example database module configured to store a plurality of values, data sets, data, and/or information.
Figure 8:
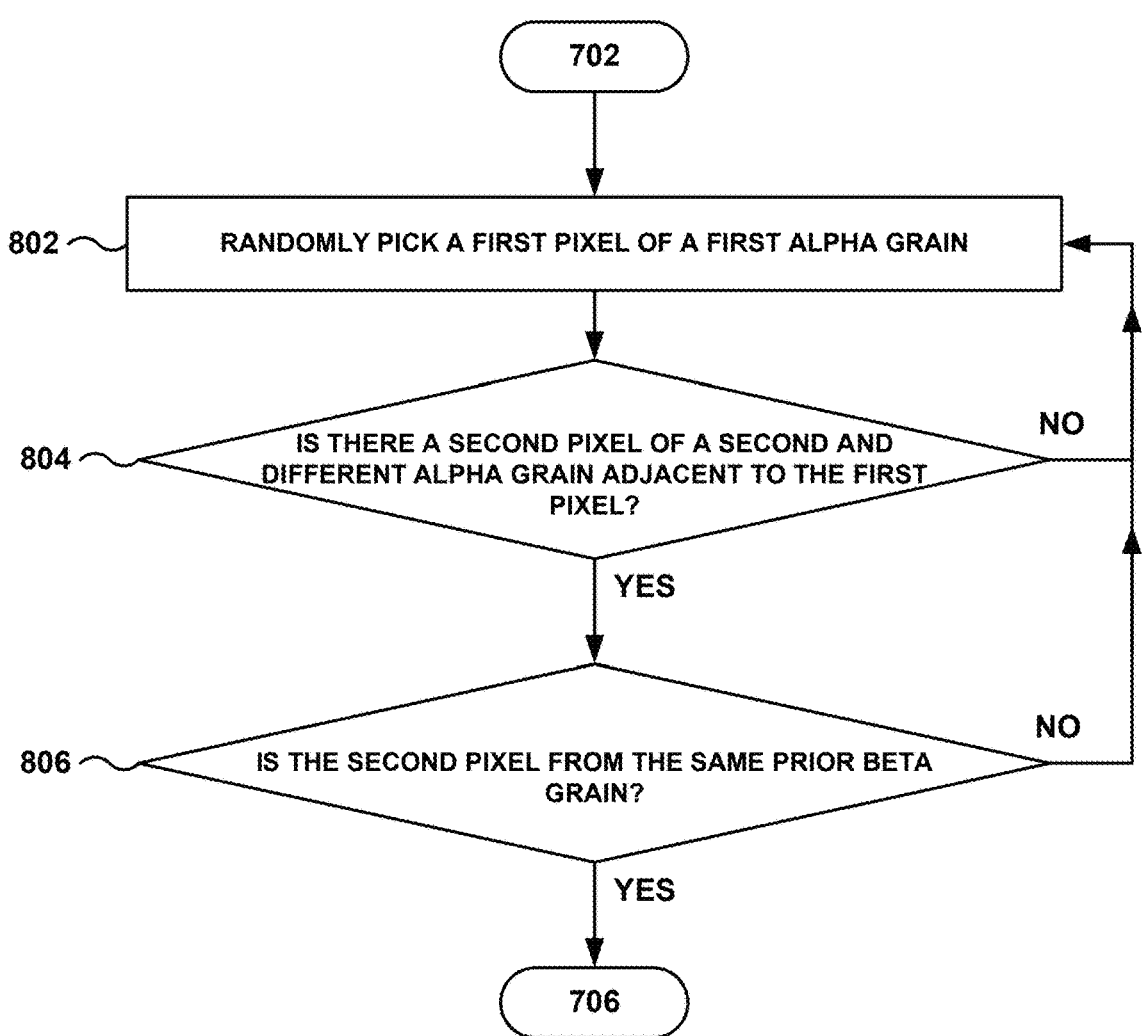
FIG. 8 is a flow diagram of an example method of determining which alpha phase grains may be from the same prior beta grain.

Method step (704) is described below with reference to FIGS. 8, 6A, 6B, and 17. FIG. 8 is a flow diagram of an example method which data analysis device 12 (or data analysis device 31) may perform to determine which alpha phase grains may be from the same prior beta grain. FIG. 6B is a schematic diagram of an example database module 34 configured to store a plurality of values, data sets, data, and/or information. FIG. 17 illustrates an example rotation matrix g(φ1, Φ, φ2) which may be used to determine the crystal axes (x', y', z') and specimen directions (X, Y, Z) of a crystal relative to the specimen coordinate system.

Referring to FIG. 8, analysis module 32 may randomly select a first pixel of a first alpha grain (802). For example, analysis module 32 may randomly select pixel 662 of alpha grain 614. In some examples, at (802), analysis module 32 may initiate (e.g., replace with an initial value such as "1" or "0") an iteration counter 770 (FIG. 6B). For example, analysis module 32 may perform one or more steps of the methods described herein iteratively and may exit an iterative loop of one or more steps based on an exit condition being satisfied. In some examples, the exit condition may be a value, or count or iteration number, of iteration counter 770.

Analysis module 32 may then determine if there is a second pixel adjacent to (e.g., touching) the first pixel 662 that is from a different alpha grain, e.g., has a different alpha grain ID associated with that adjacent pixel (804). If analysis module 32 determines that there is not a second pixel adjacent to the first pixel and from a different alpha grain (the NO branch at 804), analysis module 32 may randomly select a different first pixel of the same or a different alpha grain at (802), e.g., the method may loop back to (802). If analysis module 32 determines that there is a second pixel adjacent to the first pixel and from a different alpha grain (the YES branch at 804), analysis module 32 may determine if the second pixel is from the same prior beta grain as the first pixel (806).

For example, at (804), analysis module 32 may determine that second pixel 664 is adjacent to first pixel 662 and is from a different alpha grain 616 than first pixel 662. At (806), analysis module 32 may determine whether pixel 662, of alpha grain 616, and pixel 664, of alpha grain 662, may be from (e.g., associated with) the same prior beta grain based on a difference in the orientation (also referred to as a misorientation) of the c-axes of the crystals represented by pixels 662, 664. For example, the three Euler angles of each of the first and second pixels pixel 662, 664 may be relative to a reference, or specimen, coordinate system which may be defined by the orientation of sample 16 and measurement device 14 during the measurement of sample 16, and which may serve as a global reference coordinate frame for the pixels of alpha phase data set 652. The Euler angles may be used to determine the orientation of certain axes of symmetry and the planes of faces of the crystalline structure of sample 16 relative to the specimen coordinate system, e.g., via a rotation matrix g($\varphi$1, $\Phi$, $\varphi$2).

FIG. 17 illustrates an example rotation matrix g($\varphi$1, $\Phi$, $\varphi$2) which may be used to determine the crystal axes (x', y', z') and specimen directions (X, Y, Z) of a crystal relative to the specimen coordinate system. The c-axis of a hcp crystal, e.g., of the alpha phase of sample 16, corresponds to the z' crystal axes. Analysis module 32 may determine the misorientation between the c-axes of pixels by calculating the dot product between the z' crystal axes of each pixel, e.g., the dot product of the third row (e.g., elements a31, a32, a33) of g($\varphi$1, $\Phi$, $\varphi$2) of each pixel. In the example shown in FIG. 17, the z' axis, or c-axis, of each pixel of alpha phase data set 652 may be calculated based on only the first two Euler angles, e.g., ($\varphi$1, $\Phi$), and does not depend on the erroneous or missing third Euler angle ($\varphi$2).

As described above, a bcc prior beta grain 100 (FIG. 3) of a titanium alloy such as Ti-6Al-4V may transform to only twelve orientations of and hcp alpha phase. Of the twelve orientatons, there are only three different c-axis misorientation angles allowed, namely, 0°, 60°, and 90°. For example, two different alpha grains having phase transformed from the same prior beta grain may have c-axis orientations that differ only by 0°, 60°, or 90°. Analysis module 32 may determine whether pixel 662 and pixel 664 may be from the same prior beta grain based on the c-axis misorientation between pixel 662 and pixel 664 being substantially equal to 0°, 30°, or 90°, e.g., to within the measurement error of measurement device 14.

For example, if analysis module 32 determines that pixel 668 is the second pixel, analysis module 32 may determine that pixel 662 and pixel 664 are not from the same prior beta grain 600 (the NO branch at 806) based on the c-axis misorientation between pixels 662, 664 not being any one of 0°, 60°, and 90° plus or minus 0.5°, or plus or minus 1°, or plus or minus 2.5°, or plus or minus 5°, or plus or minus any suitable measurement error. Analysis module 32 may then randomly select a different first pixel of the same or a different alpha grain at (802), e.g., the method may loop back to (802).

Alternatively, analysis module 32 may determine that pixel 662 and pixel 664 are from the same prior beta grain 600 (the YES branch at 806) based on the c-axis misorientation between pixels 662, 664 being any one of 0°, 60°, and 90° plus or minus 0.5°, or plus or minus 10, or plus or minus 2.5°, or plus or minus 5°, or plus or minus any suitable measurement error. For example, analysis module 32 may determine that pixel 662 and pixel 664 may be from the same prior beta grain 600. The method may then advance to (706) FIG. 7, e.g., via advancing to (902) of FIG. 9, as described below.

Analysis module 32 may adjust the value of the third Euler angle ($\varphi$2) and determine a Burgers inverse transformation solution that reduces a total beta phase misorientation (706). For example, analysis module 32 may assign a value for third Euler angle ($\varphi$2) for a pair of pixels, e.g., pixels 662, 664, that are from different alpha phase grains 64, 616 and that may be from the same prior beta grain, e.g., prior beta grain 600, based on the c-axis misorientation between the pixels 662, 664.

Analysis module 32 may then select an inverse transformation (IT) solution, e.g., IT operator, that satisfies the Burgers orientation relationship for the alpha and beta phases of a material, e.g., referred to herein as a Burgers IT solution. For example, analysis module 32 may adjust the value of the third Euler angles ($\varphi$2) of all of the pixels of alpha grain 614 to the same value as pixel 662 and adjust the value of the third Euler angles ($\varphi$2) of all of the pixels of alpha grain 616 to the same value as pixel 664. Analysis module 32 may then inverse transform all of the pixels of alpha grain 614 via the selected first Burgers IT solution to a beta phase, and analysis module 32 may inverse transform all of the pixels of alpha grain 616 via the selected second Burgers IT solution to the beta phase.

The plurality of transformed pixels may be a portion of the plurality of pixels of a beta phase data set 752 (FIG. 6B) corresponding to beta phase of the measurement area 650 sample 16 that underwent a phase transformation to the alpha phase that was measured to yield alpha phase data set 652. The plurality of pixels of beta phase data set 752 may correspond, in x-y positions, to the x-y positions of the plurality of pixels of measured alpha phase data set 652. Each pixel of the plurality of pixels of beta phase data set 752 may include an x-position and a y-position, each of which may be the same as the x, y position of its corresponding pixel of the measure alpha phase data set 652, three beta phase Euler angles indicating the orientation of the body-centered cubic beta phase crystal represented by a pixel of the beta phase data set 752. Each pixel of the plurality of pixels of beta phase data set 752 may also include an alpha grain ID value (which may be the same as the alpha gran ID value of its corresponding pixel of the measure alpha phase data set 652), and a beta grain ID value (which may be the same as the beta gran ID value of its corresponding pixel of the measure alpha phase data set 652). In some examples, beta phase data set 752 may be a plurality of data sets, one for each iteration, e.g., beta phase data set 752 may be saved as a stack of images as a function of iteration number corresponding to the current total beta phase misorientation 780 and Burgers IT solutions dataset 762 of the same iteration number.

After inverse transforming the pixels of the first and second alpha grains 614, 616, analysis module 32 may determine a current total beta phase misorientation 780 (FIG. 6B) of the beta phase, e.g., based on the beta phase Euler angles of each of the pixels of the beta phase data set. If the adjusted values of the third Euler angles (φ2) of the pixels of alpha grains 614 and 616 are correct, the pixels from the different alpha grains 614 and 616 will inverse transform to the same prior beta grain, e.g., a single crystal having the same orientation in the areas corresponding to both alpha grains 614, 616. If the adjusted values of the third Euler angles (φ2) of the pixels of alpha grains 614 and 616 are incorrect but closer to being correct, the pixels from the different alpha grains 614 and 616 will inverse transform to the same prior beta grain having orientations that are more similar in the areas corresponding to both alpha grains 614, 616, and the total beta phase misorientation of beta phase data set 752 will decrease.

Figure 9:
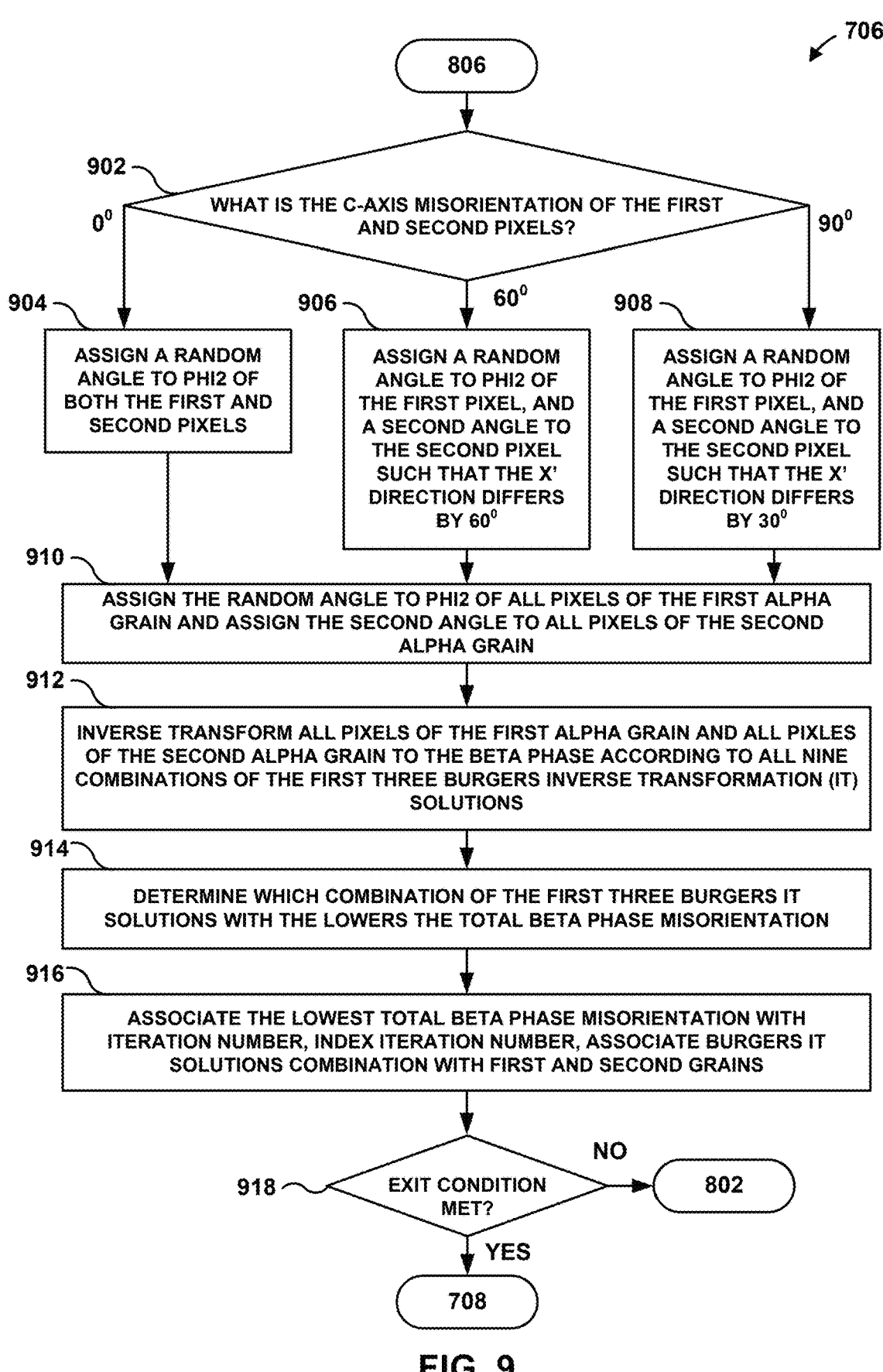
FIG. 9 is a flow diagram of an example method of adjusting the value of third Euler angles, determining a beta phase data set, and determining a Burgers inverse transformation solution that reduces a total beta phase misorientation.

Method step (706) is further described below with reference to FIGS. 9 and 10. FIG. 9 is a flow diagram of method step (706), e.g., an example method of adjusting the value of the third Euler angle (φ2), determining a beta phase data set, and determining a Burgers inverse transformation solution that reduces a total beta phase misorientation. FIG. 10 is a schematic diagram illustrating the six unique Burgers IT solutions.

Referring to FIG. 9, analysis module 32 may determine the c-axis misorientation of the first pixel and the second pixel (902). For example, analysis module 32 may determine the c-axis misorientation between first pixel 662 and second pixel 664 to be about 0°, 60°, and 90°, e.g., as described above at (806). If analysis module 32 determines the c-axis misorientation between first pixel 662 and second pixel 664 to be about 0°, analysis module 32 may assign a random angle value to the third Euler angle (φ2) of pixel 662 and the same random angle value to the third Euler angle (φ2) of pixel 664 (904). If analysis module 32 determines the c-axis misorientation between first pixel 662 and second pixel 664 to be about 60°, analysis module 32 may assign a random angle value to the third Euler angle (φ2) of pixel 662 and a different angle value to the third Euler angle (φ2) of pixel 664 such that the x' direction (FIG. 17) direction is 600 different between the pixels 662, 664, e.g., to maintain the 60° c-axis misorientation after having changed the value of the third Euler angle (φ2) of pixel 662 (906). If analysis module 32 determines the c-axis misorientation between first pixel 662 and second pixel 664 to be about 90°, analysis module 32 may assign a random angle value to the third Euler angle (φ2) of pixel 662 and a different angle value to the third Euler angle (φ²) of pixel 664 such that the x' direction (FIG. 17) direction is 90° different between the pixels 662, 664, e.g., to maintain the 90° c-axis misorientation after having changed the value of the third Euler angle (φ2) of pixel 662 (908). For each of (904)-(908), analysis module 32 may assign the random angle value to the third Euler angle (φ2) of the first pixel, e.g., pixel 662, that is from 0° to 360°. For each of (904)-(908), analysis module 32 may assign the different angle value to the third Euler angle (φ2) of the second pixel, e.g., pixel 664, that is that is cyclic from 0° to 360°. For example, if analysis module 32 assigns a different angle value of the third Euler angle (φ2) of pixel 664 that is less than 0° or greater than 360°, analysis module 32 may add or substract a multiple of 360° to the different angle value is such that the different angle value is equal to or greater than 0° and less than or equal to 360°.

Analysis module 32 may then assign the random angle value of the third Euler angle (φ2) of pixel 662 to all of the pixels of the first alpha grain having the same alpha grain ID as pixel 662, e.g., alpha grain 614 (FIG. 6A), and analysis module 32 may assign the angle value of the third Euler angle (φ2) of pixel 664 to all of the pixels of the second alpha grain having the same alpha grain ID as pixel 664, e.g., alpha grain 616.

Analysis module 32 may then inverse transform all of the first alpha grain pixels and all of the second alpha grain pixels to the beta phase according to each of nine combinations of three of the Burgers IT solutions (912). For example, analysis module 32 may inverse transform all of the first alpha grain pixels and all of the second alpha grain pixels to the beta phase according to a subset of less than all six of a set of six unique Burgers IT solutions, e.g., the first three Burgers IT solutions 1002-1006 (FIG. 10). For a single alpha phase orientation of an hcp crystal, there are six unique ways to transform the alpha phase data (e.g., orientation) into a bec beta phase crystal (e.g., of the prior beta grain). FIG. 10 illustrates a graphical representation of the six Burgers IT solutions 1002-1012. Each of 1002-1012 is a two-dimensional (2D) representation of a hcp crystal overlaid with different orientations of a resulting bcc crystal after having inverse transformed the hcp crystal according to the Burgers IT solution associated with each 2D representation. The six unique Burgers IT solutions may be six unique matrices that may be applied to a vector of the three Euler angles characterizing the orientation of the alpha phase hcp crystal in order to calculate one of the six possible orientations of the bec beta phase crystal from which the alpha phase crystal transformed. The calculation results in a vector of three beta phase Euler angles characterizing one of the six possible orientations of the bec beta phase crystal. For example, a known (or measured) crystal orientation of the alpha phase of a hcp crystal, such as Ti-6Al-4V, may have originated from one of six beta phase crystal orientations of a bec prior beta grain, and the Burgers IT solutions may be used to inverse transform the known (or measured) alpha phase orientation to one of the six possible beta phase orientations from which the alpha phase crystal transformed.

Analysis module 32 may inverse transform the pixels of the first alpha grain, e.g., alpha grain 614, by applying one of the first three Burgers IT solutions 1002-1006 to the Euler angles of each pixel of alpha grain 614. Analysis module 32 may inverse transform the pixels of the second alpha grain, e.g., alpha grain 616, by applying one of the first three Burgers IT solutions 1002-1006 (e.g., the same or a different one as applied tot to alpha grain 612) to the Euler angles of each pixel of alpha grain 616. Analysis module 32 may may inverse transform the pixels of the first and second alpha grains 614, 616 using all nine combinations (e.g., varants 1-9 of the table shown in FIG. 10) of the first three Burgers IT solutions 1002-1006, resulting in nine potential beta phase data sets corresponding to the nine variant combinations of Burgers IT solutions 1002-1006 illustrated in the last column of the table of FIG. 10.

Analysis module 32 may determine which varant combination 1-9 of the first three Burgers IT solutions 1002-1006 results in the lowest total beta phase misorientation (914). For example, analysis module 32 may compare the orientations of all of corresponding pixels of the nine potential beta phase data sets resulting from each inverse transformation from all nine variant combinations and sum (e.g., integrate) all of the misorientations of all of the pixels for each of the nine beta phase data sets.

In some examples, analysis module 32 may then select the combination of Burgers IT solutions associated with the beta phase data set having the lowest total beta phase misorientation. Analysis module 32 may then associate the lowest total beta phase misorientation with the current value of the iteration counter 770, index the iteration counter (e.g., add "1" to the iteration value), and associate the selected Burgers IT solutions combination (e.g., resulting in the lowest total beta phase misorientation) of the current iteration with the respective alpha grains 614, 616 (916). For example, analysis module 32 may cause current total beta phase misorientation 780 (FIG. 6B) to be updated with the value of the lowest total beta phase misorientation of the current iteration. In some examples, anaysis module 32 may save a plurality of current total beta phase misorientations 780, e.g., as a function of iteration number. For example, current total beta phase misorientation 780 may be an array of saved lowest total beta phase misorientation numbers, each associated with an iteration number. Analyis module 32 may also save and/or update beta phase dataset 752 to include the beta phase data set corresponding to the lowest total beta phase misorientation of the current iteration. Analysis module 32 may save and/or update Burgers IT soltions data set 762 with the Burgers IT soltions corresponding to the lowest total beta phase misorientation of the current iteration.

For example, analysis module 32 may determine that variant 4 (FIG. 10) results in the lowest total beta phase misorientation, e.g., applying Burgers IT solution 1002 to the pixels of alpha grain 614 and applying the Burgers IT solution 1004 to the pixels of alpha grain 616 results in the lowest lowest total beta phase misorientation of the nine variants. Analysis module 32 may then index iteration counter 770 in database 34. Analysis module 32 may save and/or update beta phase data set 752 to be the beta phase data set corresponding to the lowest total beta phase misorientation of the current iteration. Analysis module 32 may save and/or update at least a portio of Burgers IT solutions data set 762 with Burgers IT solutions 1002, 1004. For example, Burgers IT solutions data set 762 may include a plurality of pixels corresponding to the pixels of alpha phase data set 652, e.g., each pixel including the same x-y positions, alpha grain ID, and beta phase grain ID as each corresponding pixel of alpha phase data set 652. Each pixel of Burgers IT solutions data set 762 may also include a Burgers IT solution and/or solution identifier, e.g., one of Burgers IT solutions 1002-1012. For example, analysis module 32 may update only the pixels of Burgers IT solutions data set 762 corresponding to the alpha grain ID of the first alpha phase pixel, e.g., alpha phase pixel 662, with Burgers IT solution 1002, analysis module 32 may update only the pixels of Burgers IT solutions data set 762 corresponding to the alpha grain ID of the second alpha phase pixel, e.g., alpha phase pixel 664, with Burgers IT solution 1004.

In some examples, Burgers IT solutions data set 762 may be a plurality of data sets, one for each iteration, e.g., Burgers IT solutions data set 762 may be saved as a stack of images as a function of iteration number corresponding to the current total beta phase misorientation 780 and beta phase misorientation data set 752 of the same iteration number. For example, if the last iteration of the method of FIGS. 7-16 does not result in the lowest total beta phase misorientation across all iterations, the lowest beta phase misorientation may be saved and associated with the iteration number of the lowest beta phase misorientation, such that the beta phase misorientation data set 752 and Burgers IT solutions data set 762 of the same iteration number may be recovered.

In some examples, the lowest total beta phase misorientation of the current iteration may not be lower than the lowest total beta phase misorientation of a previous iteration. For example, the method of FIGS. 7-16 may allow the total beta phase misorientation to increase as a function of iteration number (or value), e.g., so as to be able to "exit" a saddle point (e.g., local minimum), and progress to a solution (e.g., a set of third Euler angles of data set 652 and Burgers IT solutions data set 752) that is lower than the local minium. Analysis module 32 may execute the method of FIGS. 7-16 to allow the total beta phase misorientation to increase as a function of iteration count value, at least for a number of iterations, in order to exit a saddle point or local minimum and progress to a global or lower local minimum of the total beta phase misorientation.

Analysis module 32 may determine if an exit condition is met (918). In some examples, analysis module 32 may determine that the exit condition is met when the value of iteration counter 770 is equal to an iteration exit count, e.g., a threshold number of iterations. For example, analysis module 32 may determine an iteration exit count based on the number of alpha grains of data set 652. In some examples, analysis module 32 may determine the iteration exit count to be the number of alpha grains of data set 652, or some multiple or fraction of the number of alpha grains of data set 652. In other examples, analysis module 32 may determine that the exit condition is met when the lowest or current total beta phase misorientation 780 is less than or equal to a beta phase misorientation threshold value.

If analysis module 32 determines that the exit condition is not met (the NO branch at (918), analysis module 32 may randomly select a different first pixel of the same or a different alpha grain at (802), e.g., the method may loop back to (802). For example, method steps (704) and (706), which may comprise method steps (802) through (918), may be performed in an iterative loop in which both the next pixel of the next iteration is selected randomly, and values to replace for the third Euler angle of the selected pixel (and pixels of the same alpha grain) are selected randomly as a Monte Carlo type numerical search method. If analysis module 32 determines that the exit condition is met (the YES branch at 918), the method may then advance to (708) of FIG. 7, e.g., via advancing to (1102) of FIG. 11, as described below.

Figure 12:
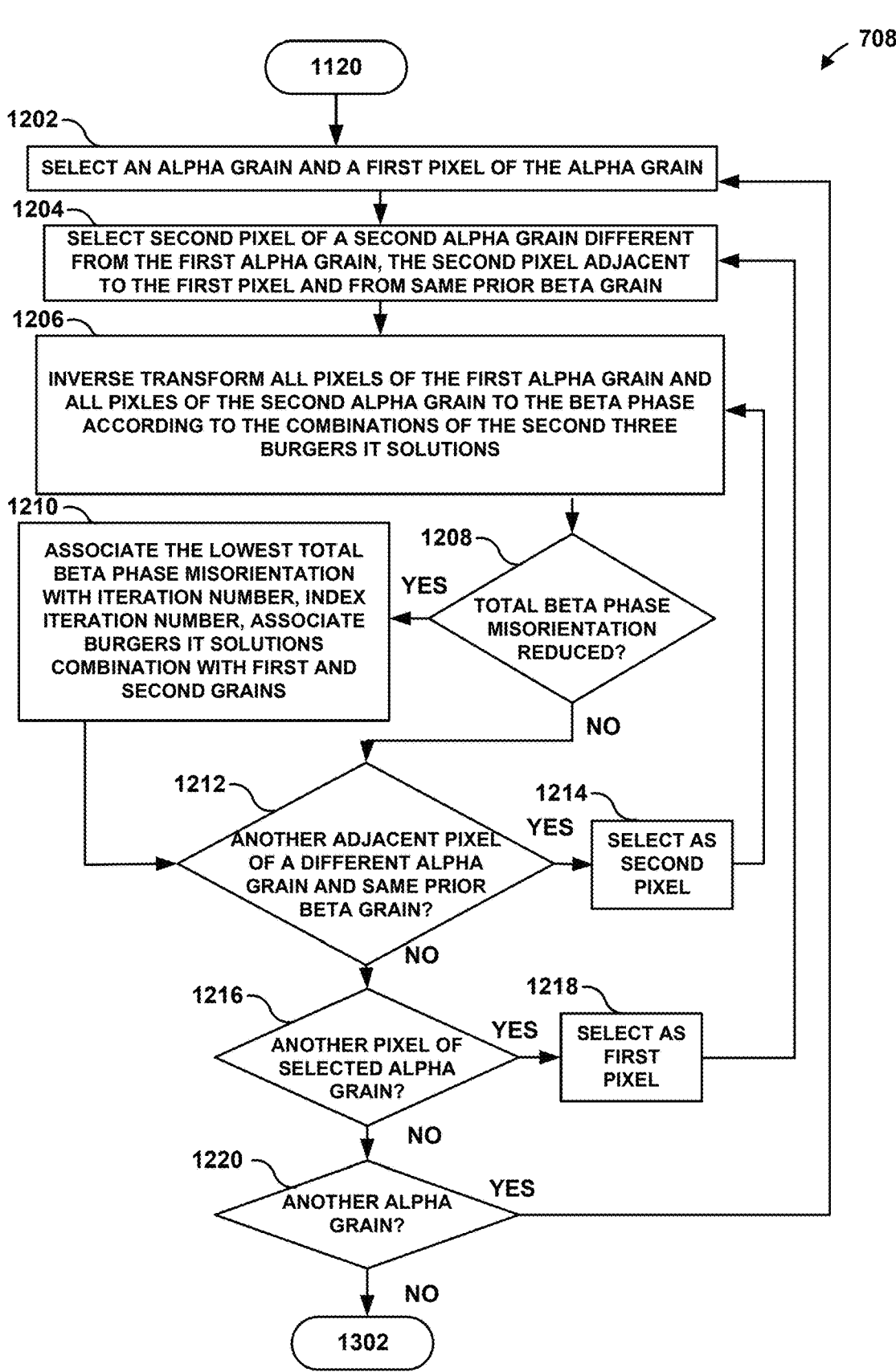
FIG. 12 is a flow diagram of an example method of refining selection of the second three Burgers IT solutions.
Figure 13:
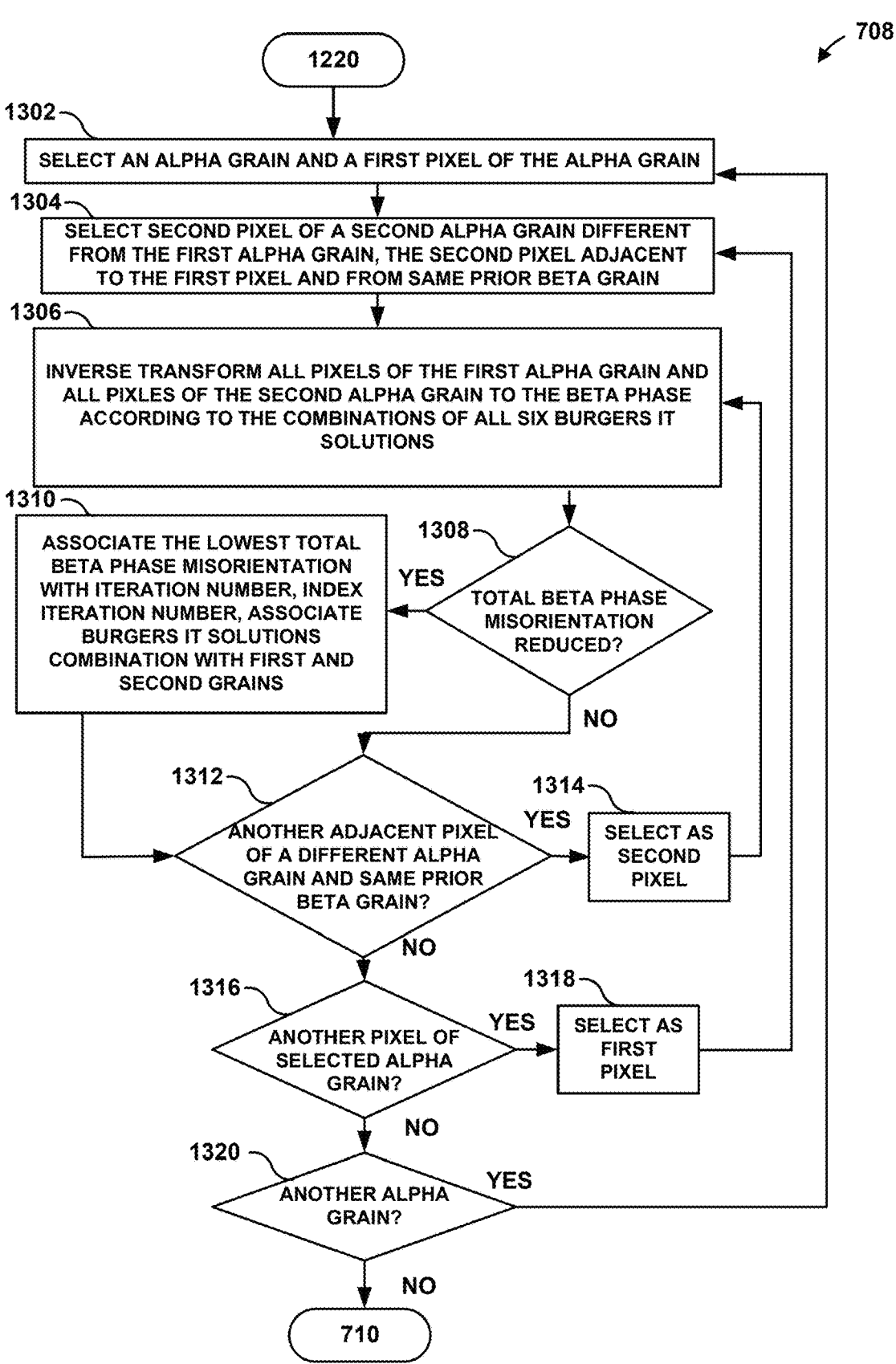
FIG. 13 is a flow diagram of an example method of refining selection of all six of Burgers IT solutions.

FIGS. 11-13 are flow diagrams of example method steps of performing method step (708) of FIG. 7. The method of each of FIGS. 11-13 are methods of refining the selection of the Burgers IT solutions that reduce the total beta phase misorientation for a given alpha phase data set 652 with adjusted or perturbed third Euler angle values. The methods of FIGS. 11-13 do not adjust or perturb the third Euler angle values, but rather describe the steps of refining the selection of a combination Burgers IT solutions to be applied to the identified alpha grains of the alpha phase data set 652, e.g., before further perturbing and refining the values of the third Euler angles of the identified alpha grains. In some examples, the methods of FIGS. 11-13 may be performed as separate iterative loops. In the examples shown, FIGS. 11-13 may iterate through at least all of the alpha grains of alpha data set 652, e.g., as opposed to performing a Monte Carlo type numerical search method in which pixels of alpha grains are randomly selected until an exit condition is met. In some examples, even though FIGS. 11-13 may be performed as separate iterative loops (e.g., from each other as well as from FIGS. 8-9), analysis module 32 may continue to track a global iteration count, e.g., iteration counter 770, across all iteration loops of the method of FIGS. 7-16.

FIG. 11 is a flow diagram of an example method of refining selection of the first three Burgers IT solutions 1002-1006. FIG. 11 is described with concurrent reference to system 10 of FIGS. 1, although other systems, such as system 27 illustrated in FIG. 2, may be used.

Analysis module 32 may select an alpha grain and a first pixel of the selected alpha grain (1102). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1104). For example, analysis module 32 may select second pixel 664 of second alpha grain 616, and both selected alpha grain 614 and different alpha grain 616 may be from prior beta grain 600 (FIG. 6A).

Analysis module 32 may inverse transform all of the pixels of the same alpha grain as the first pixel according to all nine combinations of the first three Burgers IT solutions (1106). For example, analysis module 32 may transform the updated alpha phase data set 652 to nine variants of a beta phase data set as described above at method step (912). Analysis module 32 may then determine whether the total beta phase misorientation of any of the nine variants of the beta phase data set reduces the current total beta phase misorientation 780 (1108). For example, analysis module 32 may determine the total beta phase misorientation of each of the nine variants of beta phase data sets, determine which variant is the lowest, and compare the lowest total beta phase misorientation of the nine variants to the current total beta phase misorientation value 780 stored in database module 34 at (916) or at (1110) of a previous iteration.

If analysis module 32 determines that the lowest total beta phase misorientation of the nine variants of beta phase data sets is lower than the current total beta phase misorientation value 780 (e.g., does reduce the total beta phase misorientation, the YES branch at 1108), analysis module 32 may save the lowest total beta phase misorientation of the nine variants to the current total beta phase misorientations 780, index the iteration counter (e.g., add "1" to the iteration value), and associate the Burgers IT solutions combination resulting in the lowest total beta phase misorientation alpha grains 614, 616 (1110). Analyis module 32 may also save and/or update beta phase dataset 752 to include the beta phase data set corresponding to the lowest total beta phase misorientation of the nine variants. Analysis module 32 may save and/or update Burgers IT soltions data set 762 with the Burgers IT soltions corresponding to the lowest total beta phase misorientation of the nine variants. The method may then advance to step (1112) described below.

If analysis module 32 determines that the lowest total beta phase misorientation of the nine variants of beta phase data sets is not lower than the current total beta phase misorientation value 780 (e.g., does not reduce the total beta phase misorientation, the NO branch at 1108), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1112). In some examples, the method may advance to step (1112) from the NO branch at (1108) without indexing iteration counter 770.

If analysis module 32 determines that there is another pixel of alpha phase data set 652 that is adjacent to the first pixel and from a different alpha grain (the YES branch at 1112), analysis module 32 my then select that pixel as the second pixel (1114), and the method may loop back to (1106). If analysis module 32 determines that there is not another pixel of alpha phase data set 652 that is adjacent to the first pixel and from a different alpha grain and the same prior beta grain (the NO branch at 1112), analysis module 32 may then determine whether there is another pixel of the selected alpha grain that is different from the first pixel that was not previously selected as a first pixel (1116). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1116), analysis module 32 may select that pixel as a first pixel (1118) and the method may loop back to (1104). If analysis module 32 determines that there is not another pixel of the selected alpha grain that is different from the first pixel and that was not previously selected as a first pixel (the NO branch at 1116), analysis module 32 may then determine whether there is another alpha grain that was not previously selected (1120). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1120), analysis module 32 may select that alpha grain select a first of the newly selected alpha grain (1102), e.g., the method may loop back to (1102). If analysis module 32 determines that there is not another alpha grain that was not previously selected (the NO branch at 1120), the method may advance to (1202).

In the example shown, analysis module 32 may execute method steps (1102) through (1120) to refine the selection of the Burgers IT solutions and refine Burgers IT solutions data set 762 using just the first three Burgers IT solutions 1002, 1004, 1006, e.g., before perturbing values of the third Euler angles of alpha phase data set 652 to search for the correct third Euler angles. As described below, analysis module 32 may execute method steps (1202) through (1220) to refine the selection of the Burgers IT solutions, and refine Burgers IT solutions data set 762, using just the second three Burgers IT solutions 1008, 1010, 1012, and analysis module 32 may execute method steps (1302) through (1320) to refine the selection of the Burgers IT solutions, and refine Burgers IT solutions data set 762, using all six Burgers IT solutions 1002-1012.

FIG. 12 is a flow diagram of an example method of refining selection of the second three Burgers IT solutions 1008-1012. FIG. 12 is described with concurrent reference to system 10 of FIGS. 1, although other systems, such as system 27 illustrated in FIG. 2, may be used.

Analysis module 32 may select an alpha grain and a first pixel of the selected alpha grain (1202). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1204). For example, analysis module 32 may select second pixel 664 of second alpha grain 616, and both selected alpha grain 614 and different alpha grain 616 may be from prior beta grain 600 (FIG. 6A).

Analysis module 32 may inverse transform all of the pixels of the same alpha grain as the first pixel according to all nine combinations of the second three Burgers IT solutions (1206). For example, analysis module 32 may inverse transform all of the same alpha grain as the first pixel according to a subset of less than all six of a set of six unique Burgers IT solutions, e.g., the second three Burgers IT solutions 1008-1012 (FIG. 10). In some examples, analysis module 32 may transform the updated alpha phase data set 652 to nine variants of a beta phase data set as described above at method step (912), except replacing the first three Burgers IT solutions with the second three Burgers IT solutions 1008-1012. Analysis module 32 may then determine whether the total beta phase misorientation of any of the nine variants of the beta phase data set reduces the current total beta phase misorientation 780 (1208). For example, analysis module 32 may determine the total beta phase misorientation of each of the nine variants of beta phase data sets, determine which variant is the lowest, and compare the lowest total beta phase misorientation of the nine variants to the current total beta phase misorientation value 780 stored in database module 34 at (916) or at (1210) of a previous iteration.

If analysis module 32 determines that the lowest total beta phase misorientation of the nine variants of beta phase data sets is lower than the current total beta phase misorientation value 780 (e.g., does reduce the total beta phase misorientation, the YES branch at 1208), analysis module 32 may save the lowest total beta phase misorientation of the nine variants to the current total beta phase misorientations 780, index the iteration counter (e.g., add "1" to the iteration value), and associate the Burgers IT solutions combination resulting in the lowest total beta phase misorientation alpha grains 614, 616 (1210). Analyis module 32 may also save and/or update beta phase dataset 752 to include the beta phase data set corresponding to the lowest total beta phase misorientation of the nine variants. Analysis module 32 may save and/or update Burgers IT soltions data set 762 with the Burgers IT soltions corresponding to the lowest total beta phase misorientation of the nine variants. The method may then advance to step (1212) described below.

If analysis module 32 determines that the lowest total beta phase misorientation of the nine variants of beta phase data sets is not lower than the current total beta phase misorientation value 780 (e.g., does not reduce the total beta phase misorientation, the NO branch at 1208), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1212). In some examples, the method may advance to step (1212) from the NO branch at (1208) without indexing iteration counter 770.

If analysis module 32 determines that there is another pixel of alpha phase data set 652 that is adjacent to the first pixel and from a different alpha grain (the YES branch at 1212), analysis module 32 my then select that pixel as the second pixel (1214), and the method may loop back to (1206). If analysis module 32 determines that there is not another pixel of alpha phase data set 652 that is adjacent to the first pixel and from a different alpha grain and the same prior beta grain (the NO branch at 1212), analysis module 32 may then determine whether there is another pixel of the selected alpha grain that is different from the first pixel that was not previously selected as a first pixel (1216). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1216), analysis module 32 may select that pixel as a first pixel (1218) and the method may loop back to (1204). If analysis module 32 determines that there is not another pixel of the selected alpha grain that is different from the first pixel and that was not previously selected as a first pixel (the NO branch at 1216), analysis module 32 may then determine whether there is another alpha grain that was not previously selected (1220). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1220), analysis module 32 may select that alpha grain select a first of the newly selected alpha grain (1202), e.g., the method may loop back to (1202). If analysis module 32 determines that there is not another alpha grain that was not previously selected (the NO branch at 1220), the method may advance to (1302).

FIG. 13 is a flow diagram of an example method of refining selection of all six of Burgers IT solutions 1002-1006. FIG. 13 is described with concurrent reference to system 10 of FIGS. 1, although other systems, such as system 27 illustrated in FIG. 2, may be used.

Analysis module 32 may select an alpha grain and a first pixel of the selected alpha grain (1302). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1304). For example, analysis module 32 may select second pixel 664 of second alpha grain 616, and both selected alpha grain 614 and different alpha grain 616 may be from prior beta grain 600 (FIG. 6A).

Analysis module 32 may inverse transform all of the pixels of the same alpha grain as the first pixel according to 36 combinations of all six Burgers IT solutions (1306). For example, analysis module 32 may transform the updated alpha phase data set 652 to 36 variants of a beta phase data set, similar to as described above at method step (912), except using all six of the Burgers IT solutions 1002-1012. Analysis module 32 may then determine whether the total beta phase misorientation of any of the 36 variants of the beta phase data set reduces the current total beta phase misorientation 780 (1308). For example, analysis module 32 may determine the total beta phase misorientation of each of the 36 variants of beta phase data sets, determine which variant is the lowest, and compare the lowest total beta phase misorientation of the 36 variants to the current total beta phase misorientation value 780 stored in database module 34 at (916) or at (1310) of a previous iteration.

If analysis module 32 determines that the lowest total beta phase misorientation of the 36 variants of beta phase data sets is lower than the current total beta phase misorientation value 780 (e.g., does reduce the total beta phase misorientation, the YES branch at 1308), analysis module 32 may save the lowest total beta phase misorientation of the 36 variants to the current total beta phase misorientations 780, index the iteration counter (e.g., add "1" to the iteration value), and associate the Burgers IT solutions combination resulting in the lowest total beta phase misorientation alpha grains 614, 616 (1310). Analyis module 32 may also save and/or update beta phase dataset 752 to include the beta phase data set corresponding to the lowest total beta phase misorientation of the 36 variants. Analysis module 32 may save and/or update Burgers IT soltions data set 762 with the Burgers IT soltions corresponding to the lowest total beta phase misorientation of the 36 variants. The method may then advance to step (1312) described below.

If analysis module 32 determines that the lowest total beta phase misorientation of the 36 variants of beta phase data sets is not lower than the current total beta phase misorientation value 780 (e.g., does not reduce the total beta phase misorientation, the NO branch at 1308), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1312). In some examples, the method may advance to step (1312) from the NO branch at (1308) without indexing iteration counter 770.

If analysis module 32 determines that there is another pixel of alpha phase data set 652 that is adjacent to the first pixel and from a different alpha grain (the YES branch at 1312), analysis module 32 my then select that pixel as the second pixel (1314), and the method may loop back to (1306). If analysis module 32 determines that there is not another pixel of alpha phase data set 652 that is adjacent to the first pixel and from a different alpha grain and the same prior beta grain (the NO branch at 1312), analysis module 32 may then determine whether there is another pixel of the selected alpha grain that is different from the first pixel that was not previously selected as a first pixel (1316). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1316), analysis module 32 may select that pixel as a first pixel (1318) and the method may loop back to (1304). If analysis module 32 determines that there is not another pixel of the selected alpha grain that is different from the first pixel and that was not previously selected as a first pixel (the NO branch at 1316), analysis module 32 may then determine whether there is another alpha grain that was not previously selected (1320). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1320), analysis module 32 may select that alpha grain select a first of the newly selected alpha grain (1302), e.g., the method may loop back to (1302). If analysis module 32 determines that there is not another alpha grain that was not previously selected (the NO branch at 1320), the method may advance to (710).

Figure 14:
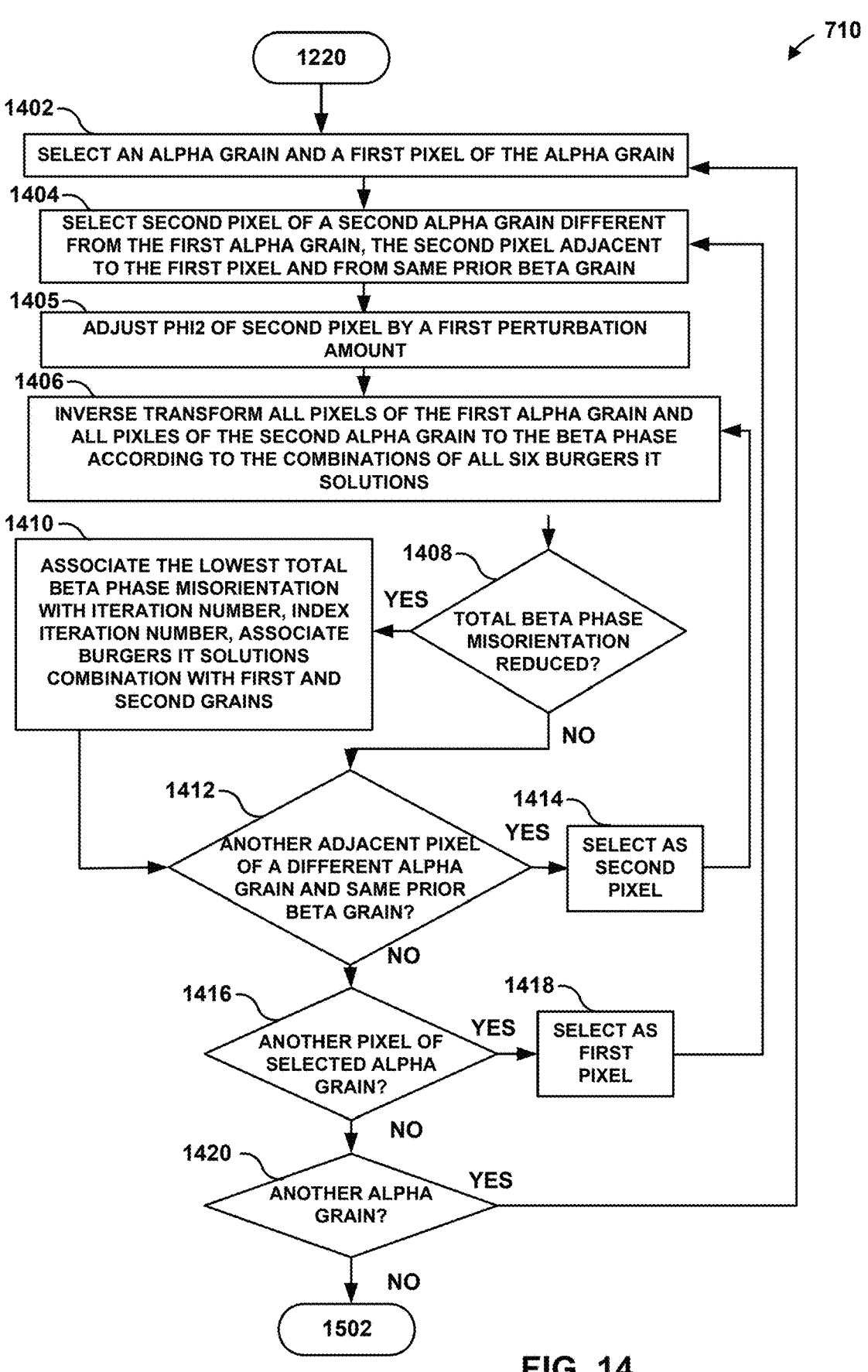
FIG. 14 is a flow diagram of an example method of refining values of third Euler angles as well as selection of all six Burgers IT solutions.
Figure 15:
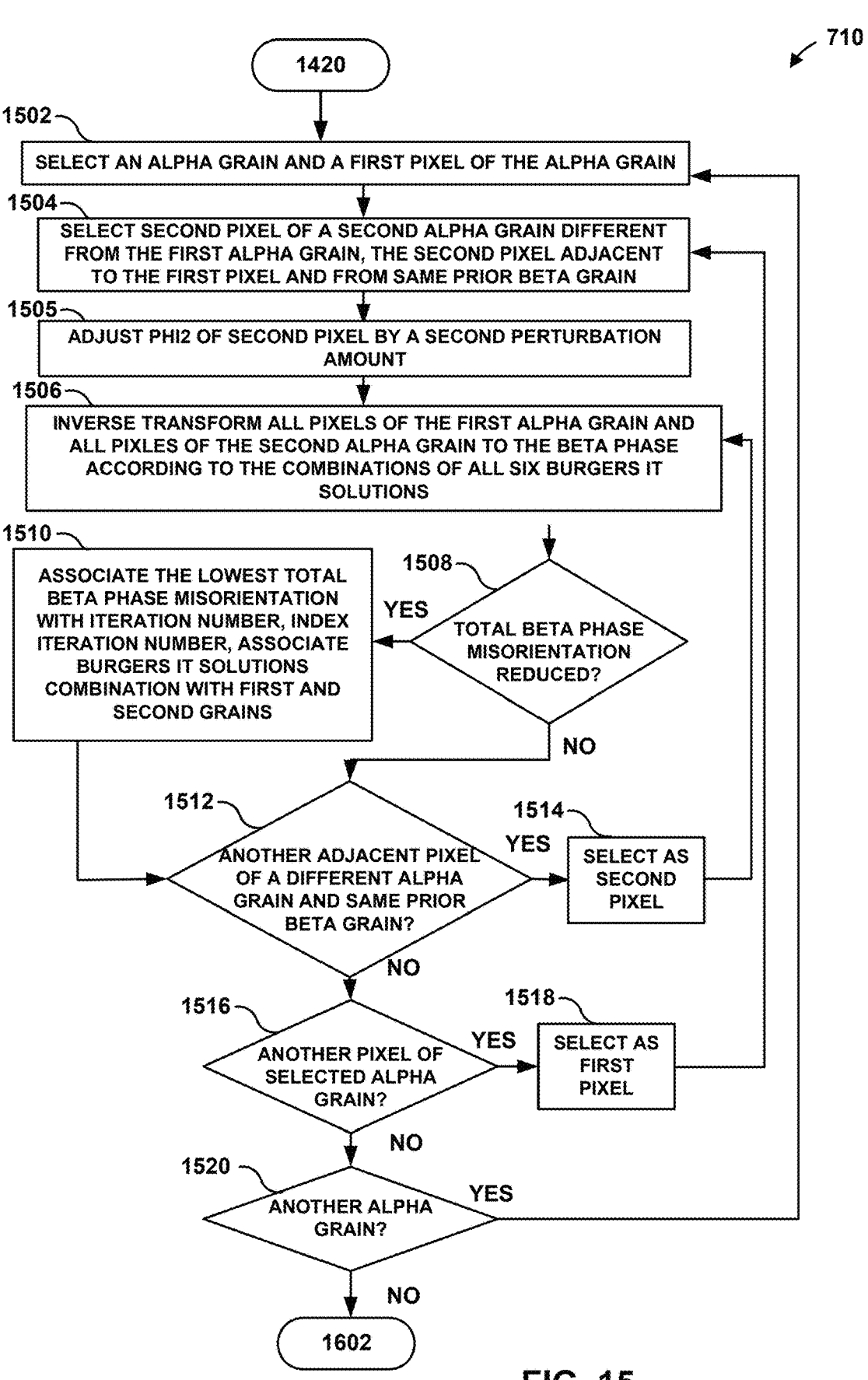
FIG. 15 is a flow diagram of an example method of further refining values of third Euler angles as well as selection of all six Burgers IT solutions.
Figure 16:
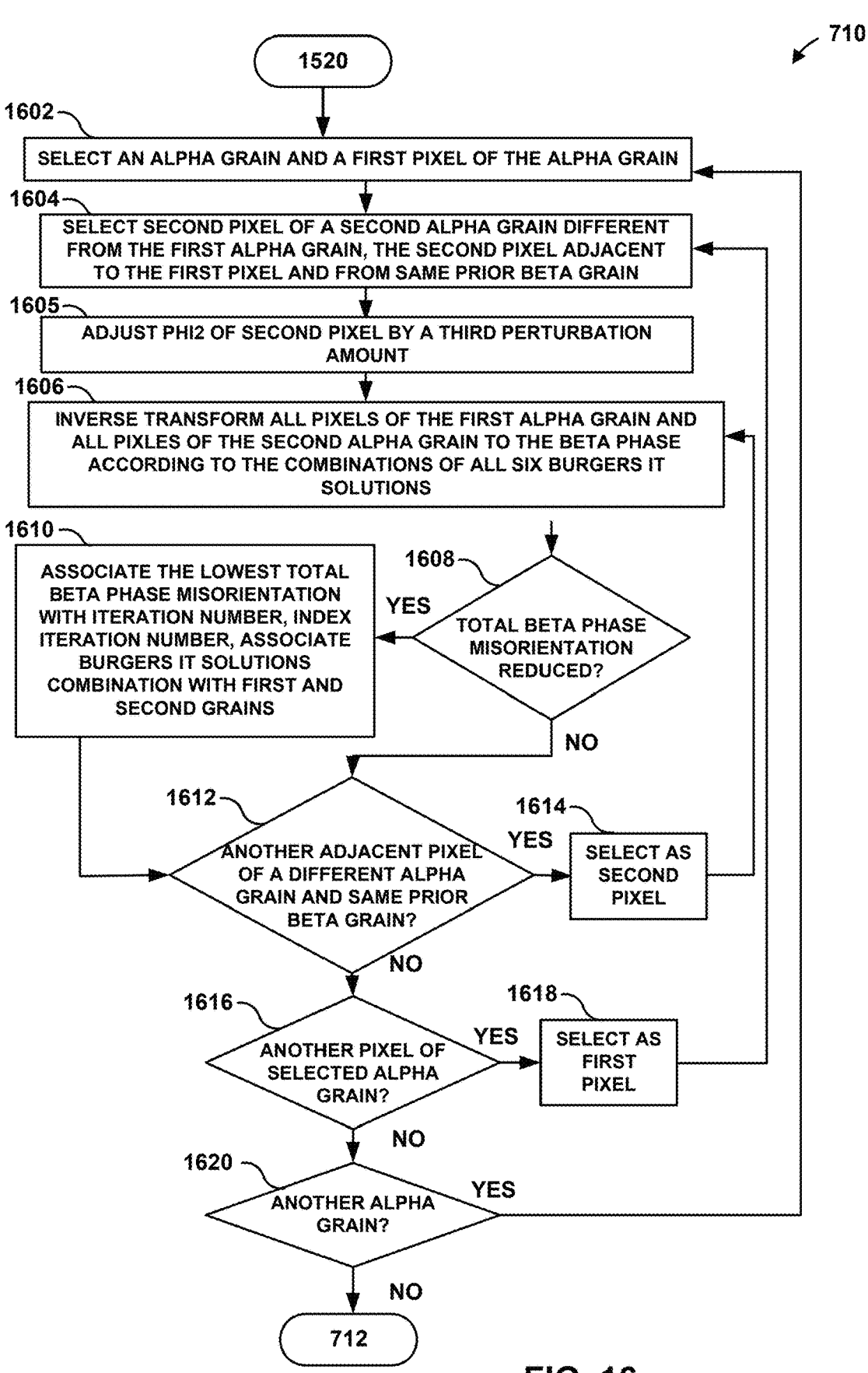
FIG. 16 is a flow diagram of an example method of further refining values of third Euler angles as well as selection of all six Burgers IT solutions.

FIGS. 14-16 are flow diagrams of example method steps of performing method step (710) of FIG. 7. The method of each of FIGS. 14-16 are methods of refining the values of the third Euler angle values of alpha phase data set 652 by iteratively perturbing the values by different amounts, and then further refining selection of the Burgers IT solutions after each refinement/perturbation of a third Euler angle. In some examples, the methods of FIGS. 14-16 may be performed as separate iterative loops. In the examples shown, FIGS. 14-16 may iterate through at least all of the alpha grains of alpha data set 652, e.g., as opposed to performing a Monte Carlo type numerical search method in which pixels of alpha grains are randomly selected until an exit condition is met. In some examples, even though FIGS. 14-16 may be performed as separate iterative loops (e.g., from each other as well as from FIGS. 8-9), analysis module 32 may continue to track a global iteration count, e.g., iteration counter 770, across all iteration loops of the method of FIGS. 7-16.

FIG. 14 is a flow diagram of an example method of refining values of third Euler angles as well as selection of all six Burgers IT solutions 1002-1006. FIG. 14 is described with concurrent reference to system 10 of FIGS. 1, although other systems, such as system 27 illustrated in FIG. 2, may be used.

Analysis module 32 may select an alpha grain and a first pixel of the selected alpha grain (1402). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1404). For example, analysis module 32 may select second pixel 664 of second alpha grain 616, and both selected alpha grain 614 and different alpha grain 616 may be from prior beta grain 600 (FIG. 6A).

Analysis module 32 may perturb (e.g., change or adjust) the value of the third Euler angle ($\varphi 2$) of the first pixel by a first perturbation amount (1405). For example, analysis module 32 may add or subtract a perturbation amount of 30 degrees to the third Euler angle ($\varphi 2$) of pixel 662. In some examples, control module 32 perturbs the value of the third Euler angles ($\varphi 2$) of all of the pixels of the same alpha grain ID is the first pixel, e.g., all of the pixels of alpha grain 614.

Analysis module 32 may inverse transform all of the pixels of the same alpha grain as the first pixel according to 36 combinations of all six Burgers IT solutions (1406). For example, analysis module 32 may transform the updated alpha phase data set 652 to 36 variants of a beta phase data set, similar to as described above at method step (912), except using all six of the Burgers IT solutions 1002-1012. Analysis module 32 may then determine whether the total beta phase misorientation of any of the 36 variants of the beta phase data set reduces the current total beta phase misorientation 780 (1408). For example, analysis module 32 may determine the total beta phase misorientation of each of the 36 variants of beta phase data sets, determine which variant is the lowest, and compare the lowest total beta phase misorientation of the 36 variants to the current total beta phase misorientation value 780 stored in database module 34 at (916) or at (1410) of a previous iteration.

If analysis module 32 determines that the lowest total beta phase misorientation of the 36 variants of beta phase data sets is lower than the current total beta phase misorientation value 780 (e.g., does reduce the total beta phase misorientation, the YES branch at 1408), analysis module 32 may save the lowest total beta phase misorientation of the 36 variants to the current total beta phase misorientations 780, index the iteration counter (e.g., add "1" to the iteration value), and associate the Burgers IT solutions combination resulting in the lowest total beta phase misorientation alpha grains 614, 616 (1410). Analyis module 32 may also save and/or update beta phase dataset 752 to include the beta phase data set corresponding to the lowest total beta phase misorientation of the 36 variants. Analysis module 32 may save and/or update Burgers IT soltions data set 762 with the Burgers IT soltions corresponding to the lowest total beta phase misorientation of the 36 variants. The method may then advance to step (1412) described below. If analysis module 32 determines that the lowest total beta phase misorientation of the nine variants of beta phase data sets is not lower than the current total beta phase misorientation value 780 (e.g., does not reduce the total beta phase misorientation, the NO branch at 1408), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1412). In some examples, the method may advance to step (1412) from the NO branch at (1408) without indexing iteration counter 770.

If analysis module 32 determines that there is another pixel of alpha phase data set 652 that is adjacent to the first pixel and from a different alpha grain (the YES branch at 1412), analysis module 32 my then select that pixel as the second pixel (1414), and the method may loop back to (1406). If analysis module 32 determines that there is not another pixel of alpha phase data set 652 that is adjacent to the first pixel and from a different alpha grain and the same prior beta grain (the NO branch at 1412), analysis module 32 may then determine whether there is another pixel of the selected alpha grain that is different from the first pixel that was not previously selected as a first pixel (1416). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1416), analysis module 32 may select that pixel as a first pixel (1418) and the method may loop back to (1404). If analysis module 32 determines that there is not another pixel of the selected alpha grain that is different from the first pixel and that was not previously selected as a first pixel (the NO branch at 1416), analysis module 32 may then determine whether there is another alpha grain that was not previously selected (1420). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1420), analysis module 32 may select that alpha grain select a first of the newly selected alpha grain (1402), e.g., the method may loop back to (1402). If analysis module 32 determines that there is not another alpha grain that was not previously selected (the NO branch at 1420), the method may advance to (1502).

FIG. 15 is a flow diagram of an example method of further refining values of third Euler angles as well as selection of all six Burgers IT solutions 1002-1006. FIG. 15 is described with concurrent reference to system 10 of FIGS. 1, although other systems, such as system 27 illustrated in FIG. 2, may be used.

Analysis module 32 may select an alpha grain and a first pixel of the selected alpha grain (1502). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1504). For example, analysis module 32 may select second pixel 664 of second alpha grain 616, and both selected alpha grain 614 and different alpha grain 616 may be from prior beta grain 600 (FIG. 6A).

Analysis module 32 may perturb (e.g., change or adjust) the value of the third Euler angle (φ2) of the first pixel by a second perturbation amount (1505). For example, analysis module 32 may add or subtract a perturbation amount of about 10.5 degrees to the third Euler angle (φ2) of pixel 662. In some examples, control module 32 perturbs the value of the third Euler angles (φ2) of all of the pixels of the same alpha grain ID is the first pixel, e.g., all of the pixels of alpha grain 614.

Analysis module 32 may inverse transform all of the pixels of the same alpha grain as the first pixel according to all nine combinations of the first three Burgers IT solutions (1506). For example, analysis module 32 may transform the updated alpha phase data set 652 to nine variants of a beta phase data set as described above at method step (912). Analysis module 32 may then determine whether the total beta phase misorientation of any of the nine variants of the beta phase data set reduces the current total beta phase misorientation 780 (1508). For example, analysis module 32 may determine the total beta phase misorientation of each of the nine variants of beta phase data sets, determine which variant is the lowest, and compare the lowest total beta phase misorientation of the nine variants to the current total beta phase misorientation value 780 stored in database module 34 at (916) or at (1510) of a previous iteration.

If analysis module 32 determines that the lowest total beta phase misorientation of the nine variants of beta phase data sets is lower than the current total beta phase misorientation value 780 (e.g., does reduce the total beta phase misorientation, the YES branch at 1508), analysis module 32 may save the lowest total beta phase misorientation of the nine variants to the current total beta phase misorientations 780, index the iteration counter (e.g., add "1" to the iteration value), and associate the Burgers IT solutions combination resulting in the lowest total beta phase misorientation alpha grains 614, 616 (1510). Analyis module 32 may also save and/or update beta phase dataset 752 to include the beta phase data set corresponding to the lowest total beta phase misorientation of the nine variants. Analysis module 32 may save and/or update Burgers IT soltions data set 762 with the Burgers IT soltions corresponding to the lowest total beta phase misorientation of the nine variants. The method may then advance to step (1512) described below.

If analysis module 32 determines that the lowest total beta phase misorientation of the nine variants of beta phase data sets is not lower than the current total beta phase misorientation value 780 (e.g., does not reduce the total beta phase misorientation, the NO branch at 1508), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1512). In some examples, the method may advance to step (1512) from the NO branch at (1508) without indexing iteration counter 770.

If analysis module 32 determines that there is another pixel of alpha phase data set 652 that is adjacent to the first pixel and from a different alpha grain (the YES branch at 1512), analysis module 32 my then select that pixel as the second pixel (1514), and the method may loop back to (1506). If analysis module 32 determines that there is not another pixel of alpha phase data set 652 that is adjacent to the first pixel and from a different alpha grain and the same prior beta grain (the NO branch at 1512), analysis module 32 may then determine whether there is another pixel of the selected alpha grain that is different from the first pixel that was not previously selected as a first pixel (1516). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1516), analysis module 32 may select that pixel as a first pixel (1518) and the method may loop back to (1504). If analysis module 32 determines that there is not another pixel of the selected alpha grain that is different from the first pixel and that was not previously selected as a first pixel (the NO branch at 1516), analysis module 32 may then determine whether there is another alpha grain that was not previously selected (1520). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1520), analysis module 32 may select that alpha grain select a first of the newly selected alpha grain (1502), e.g., the method may loop back to (1502). If analysis module 32 determines that there is not another alpha grain that was not previously selected (the NO branch at 1520), the method may advance to (1602).

FIG. 16 is a flow diagram of an example method of further refining values of third Euler angles as well as selection of all six Burgers IT solutions 1002-1006. FIG. 16 is described with concurrent reference to system 10 of FIGS. 1, although other systems, such as system 27 illustrated in FIG. 2, may be used.

Analysis module 32 may select an alpha grain and a first pixel of the selected alpha grain (1602). For example, analysis module 32 may select first pixel 662 of selected alpha grain 614 (FIG. 6A). Analysis module 32 may select a second pixel of a second alpha grain different from the selected alpha grain, and the second pixel also being adjacent to (e.g., "touching") the first pixel, and where the second pixel also may be from the same prior beta grain as the first pixel (1604). For example, analysis module 32 may select second pixel 664 of second alpha grain 616, and both selected alpha grain 614 and different alpha grain 616 may be from prior beta grain 600 (FIG. 6A).

Analysis module 32 may perturb (e.g., change or adjust) the value of the third Euler angle ($\varphi2$) of the first pixel by a third perturbation amount (1605). For example, analysis module 32 may add or subtract a perturbation amount of about 5.2 degrees to the third Euler angle ($\varphi2$) of pixel 662. In some examples, control module 32 perturbs the value of the third Euler angles ($\varphi2$) of all of the pixels of the same alpha grain ID is the first pixel, e.g., all of the pixels of alpha grain 614.

Analysis module 32 may inverse transform all of the pixels of the same alpha grain as the first pixel according to all nine combinations of the first three Burgers IT solutions (1606). For example, analysis module 32 may transform the updated alpha phase data set 652 to nine variants of a beta phase data set as described above at method step (912). Analysis module 32 may then determine whether the total beta phase misorientation of any of the nine variants of the beta phase data set reduces the current total beta phase misorientation 780 (1608). For example, analysis module 32 may determine the total beta phase misorientation of each of the nine variants of beta phase data sets, determine which variant is the lowest, and compare the lowest total beta phase misorientation of the nine variants to the current total beta phase misorientation value 780 stored in database module 34 at (916) or at (1610) of a previous iteration.

If analysis module 32 determines that the lowest total beta phase misorientation of the nine variants of beta phase data sets is lower than the current total beta phase misorientation value 780 (e.g., does reduce the total beta phase misorientation, the YES branch at 1608), analysis module 32 may save the lowest total beta phase misorientation of the nine variants to the current total beta phase misorientations 780, index the iteration counter (e.g., add "1" to the iteration value), and associate the Burgers IT solutions combination resulting in the lowest total beta phase misorientation alpha grains 614, 616 (1610). Analyis module 32 may also save and/or update beta phase dataset 752 to include the beta phase data set corresponding to the lowest total beta phase misorientation of the nine variants. Analysis module 32 may save and/or update Burgers IT soltions data set 762 with the Burgers IT soltions corresponding to the lowest total beta phase misorientation of the nine variants. The method may then advance to step (1612) described below.

If analysis module 32 determines that the lowest total beta phase misorientation of the nine variants of beta phase data sets is not lower than the current total beta phase misorientation value 780 (e.g., does not reduce the total beta phase misorientation, the NO branch at 1608), analysis module 32 may determine whether there is another pixel of alpha phase data set 652 that is adjacent to the first pixel, e.g., pixel 662, whetherhat pixel is from a different alpha grain than the first pixel, e.g., has a different alpha grain ID than pixel 662, and whether that pixel may be from the same prior beta grain, e.g., has the same prior beta grain ID as pixel 662 (1612). In some examples, the method may advance to step (1612) from the NO branch at (1608) without indexing iteration counter 770.

If analysis module 32 determines that there is another pixel of alpha phase data set 652 that is adjacent to the first pixel and from a different alpha grain (the YES branch at 1612), analysis module 32 my then select that pixel as the second pixel (1614), and the method may loop back to (1606). If analysis module 32 determines that there is not another pixel of alpha phase data set 652 that is adjacent to the first pixel and from a different alpha grain and the same prior beta grain (the NO branch at 1612), analysis module 32 may then determine whether there is another pixel of the selected alpha grain that is different from the first pixel that was not previously selected as a first pixel (1616). For example, analysis module 32 may store the x-y position of pixel 662 in database 34 as having been selected, and may determine whether there are other pixels having the same alpha grain ID as pixel 662 that have not been selected.

If analysis module 32 determines that there is another pixel of the selected alpha grain that is different from the first pixel and that was not previously selected as a first pixel (the YES branch at 1616), analysis module 32 may select that pixel as a first pixel (1618) and the method may loop back to (1604). If analysis module 32 determines that there is not another pixel of the selected alpha grain that is different from the first pixel and that was not previously selected as a first pixel (the NO branch at 1616), analysis module 32 may then determine whether there is another alpha grain that was not previously selected (1620). For example, analysis module 32 may store the alpha grain ID of alpha grain 614 in database 34 as having been selected, and may determine whether there are other alpha grain IDs that have not, e.g., alpha grain 616.

If analysis module 32 determines that there is another alpha grain that was not previously selected (the YES branch at 1620), analysis module 32 may select that alpha grain select a first of the newly selected alpha grain (1602), e.g., the method may loop back to (1602). If analysis module 32 determines that there is not another alpha grain that was not previously selected (the NO branch at 1620), the method may advance to (712).

Analysis module 32 may determine the third Euler angles (φ2) of alpha phase data set 652 (712). For example, analysis module 32 may determine the third Euler angles (φ2) by retrieving the refined the third Euler angles (φ2) values of each of the pixels from database 34. In other examples, analysis module 32 may determine the third Euler angles (φ2) based on the adjusted/refined beta phase data set 752 and the adjusted/refined Burgers IT solution data set 762. Analysis module 32 may determine the presence and/or size statistics of one or more MTR based on alpha phase data set 652 with corrected third Euler angles (714). In some examples, analysis module 32 may output an alert based on determining the MTR, e.g., to output device 38.

In some examples, a blade, or other component, of a gas turbine engine includes sample 16, and analysis module 32 may determine a status of the blade based on at least one of alpha phase data set 652 or the MTR and output the status of the blade, e.g., to output device 38. For example, analysis module 32 may determine a PASS or FAIL status of the fan blade based on the presence and/or size statistics of one or more MTR, e.g., the status being indicative of the robustness of the material of sample 16 and the blade and resistance to failure, such as a cold dwell failure.

Figure 18:
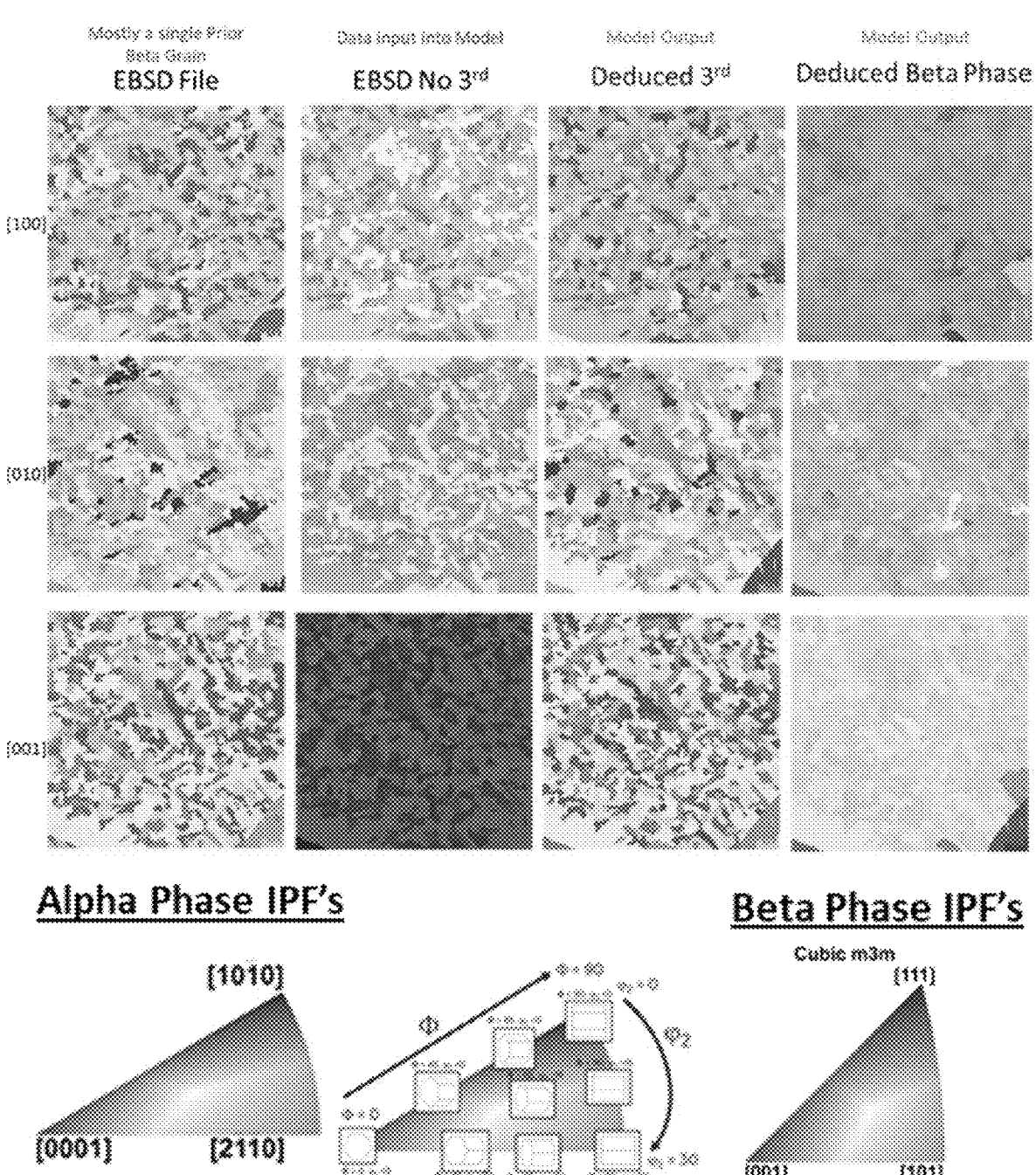
FIG. 18 is a set of two-dimensional heat maps illustrating the results an example alpha phase data set determined via the method of FIG. 7 compared with an electron backscatter diffraction measurement of the alpha phase data set, each for an area including the same single prior beta grain.

FIG. 18 is a set of two-dimensional heat maps illustrating the results of the x', y', and z' axes of an alpha phase data set including third Euler angles and corresponding beta phase data set determined via the method of FIG. 7 compared with the results of the x', y', and z' axes of an alpha phase data set and corresponding beta phase data set measured via electron backscatter diffraction, each for an area including mostly the same single prior beta grain. FIG. 19 is a table of the misorientations and axis direction for alpha phase orientations from a single prior beta grain corresponding to the alpha phase data set of FIG. 18. In the example shown in FIG. 18, the deduced (e.g., determined via the method of FIG. 7) beta phase (e.g., the determined prior beta grain) was deduced from an EBSD measured alpha phase data with the third Euler angle removed, and is shown to be correct based on implication of the Burgers relationship in terms of pole figure correspondence of the $(110)_\beta$ and the $(0001)_\alpha$ pole figures (FIG. 20). FIG. 20 is an illustration of the correspondence of the deduced $(110)_\beta$ pole figure with the $(0001)_\alpha$ third Euler angle deduced and measured pole figures. The deduced beta phase is shown to be correct also based on implication of the Burgers relationship in terms of pole figure correspondence of the $(111)_\beta$ and the $(11\text{-}20)_\alpha$ pole figures (FIG. 21). FIG. 21 is an illustration of the correspondence of the deduced $(111)_\beta$ pole figure with the $(11\text{-}20)_\alpha$ third Euler angle deduced and measured pole figures.

Figure 22:
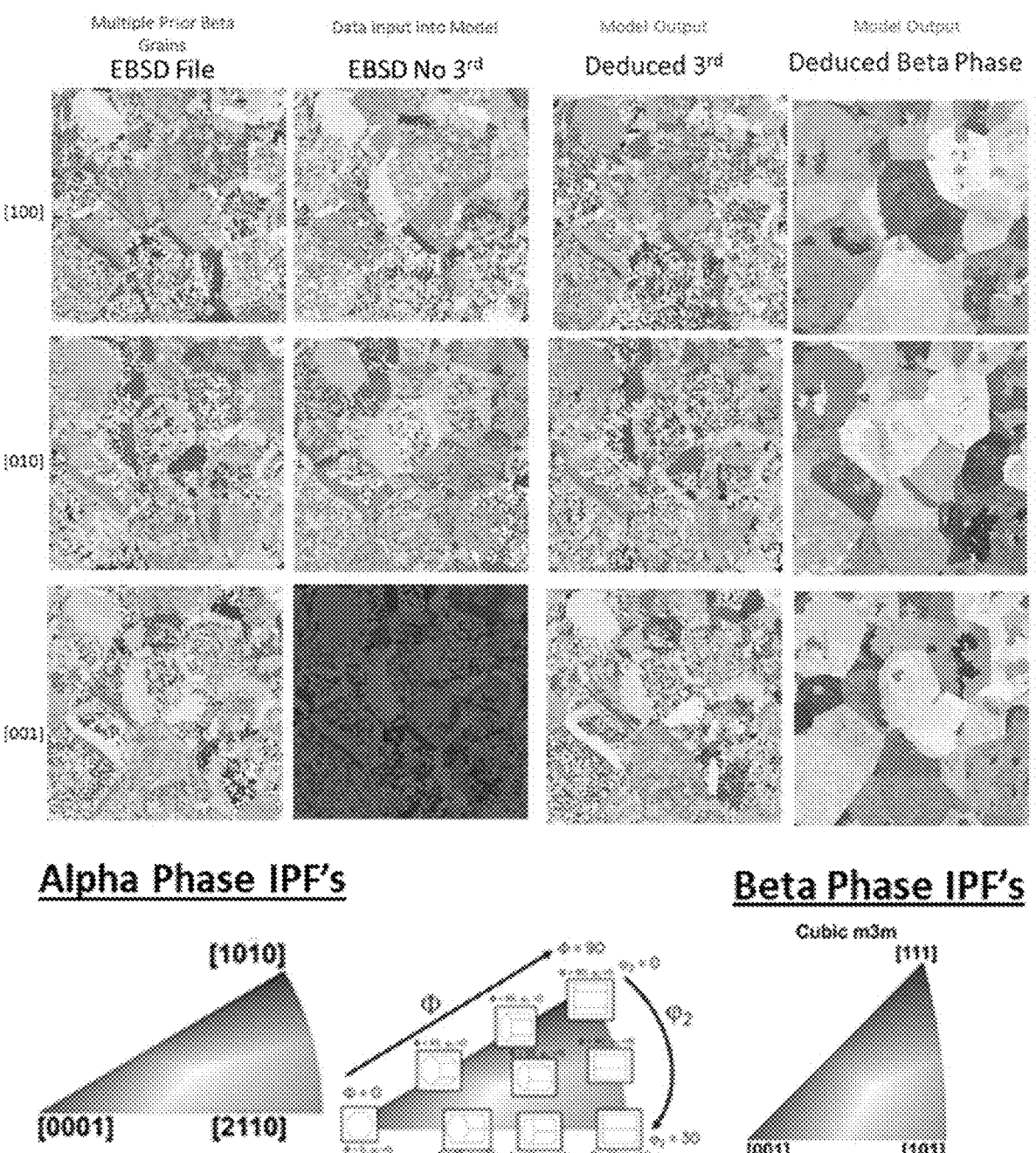
FIG. 22 is a set of two-dimensional heat maps illustrating the results an example alpha phase data set determined via the method of FIG. 7 compared with an electron backscatter diffraction measurement of the alpha phase data set, each for an area including the same plurality of prior beta grains.

FIG. 22 is a set of two-dimensional heat maps illustrating the results of the x', y', and z' axes of an alpha phase data set including third Euler angles and corresponding beta phase data set determined via the method of FIG. 7 compared with the results of the x', y', and z' axes of an alpha phase data set and corresponding beta phase data set measured via electron backscatter diffraction, each for an area including the same plurality of prior beta grains.

In some examples, because the systems, devices, and methods disclosed herein generate all pole figures, prior beta grain orientations, and inverse pole figure maps correctly, the methodology may be used to measured MTR distributions accurately and may be used in conjunction with techniques such as polarized light to characterize the complete crystallographic orientation specimens optically.

The devices, systems, and methods disclosed herein may be used to calculate the underlying beta grain orientation, e.g., corresponding to a measured alpha phase data set, with an understanding of several concepts. For example, for an arbitrary rotation matrix g(φ1, Φ, φ2), the direction of the c-axis or the [001] crystal direction (e.g., z' direction) in the rotated reference form may be defined by the bottom row (e.g., third row) of the rotation matrix (FIG. 17), and the dot product of the bottom row of two arbitrary rotation matrices may define the misorientation of the c-axis of two hcp crystals. Once a third Euler angle ($\varphi^2$) is defined, a product of the top row of two arbitrary rotation matrices may define the mis-orientation of the x' directions for two arbitrary crystals. Once a third Euler angle ($\varphi^2$) is defined, a product of the middle row of two arbitrary rotation matrices g(φ1, Φ, φ2) may define the misorientation of the y' directions for two arbitrary crystals.

In some examples, the interplanar angles of (110) planes in the beta phase are restricted to 0, 60, and 90 degrees, the interplanar angles of (111) planes in the beta phase are 0 and 70 degrees, 32 seconds, the interplanar angles between the (110) and (111) planes in the beta phase are 35 degrees, 16 seconds and 90 degrees, and the (11-20) and (10-10) planes of the hcp phase are 30 degrees apart from one another.

Figure 23:
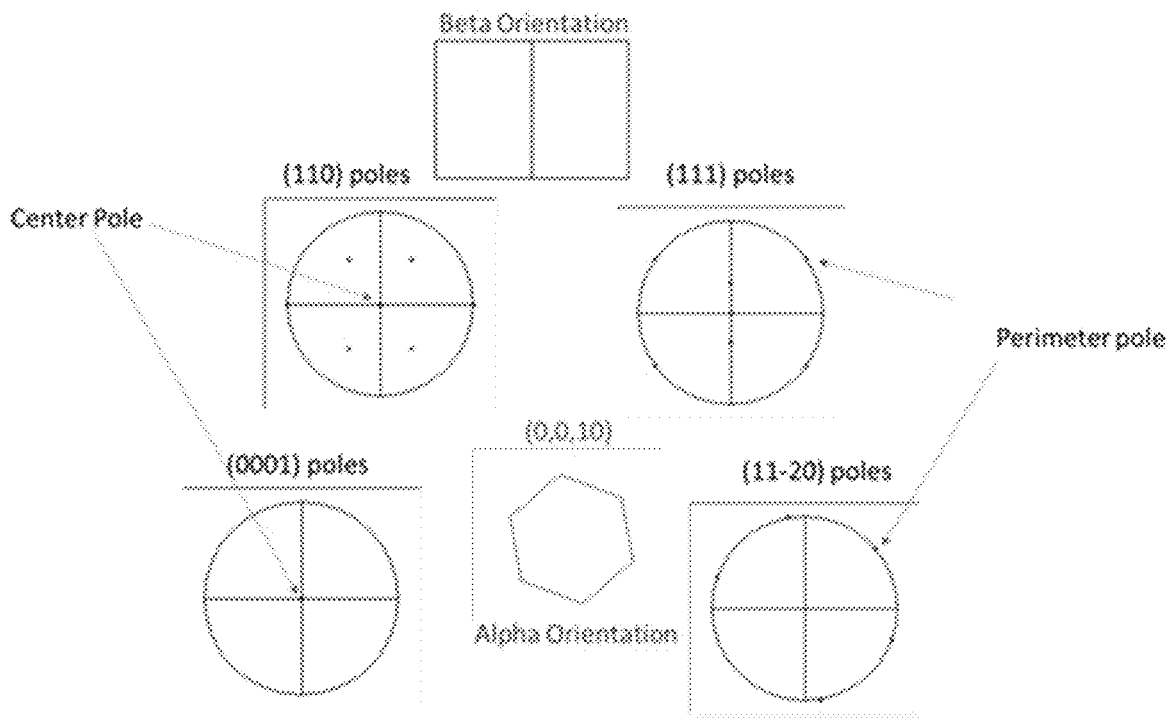
FIG. 23 is an illustration of plots of the alpha and beta phase orientations for two adjacent pixels of an example alpha data set having a c-axis misorientation of 0° or 1800.
Figure 24:
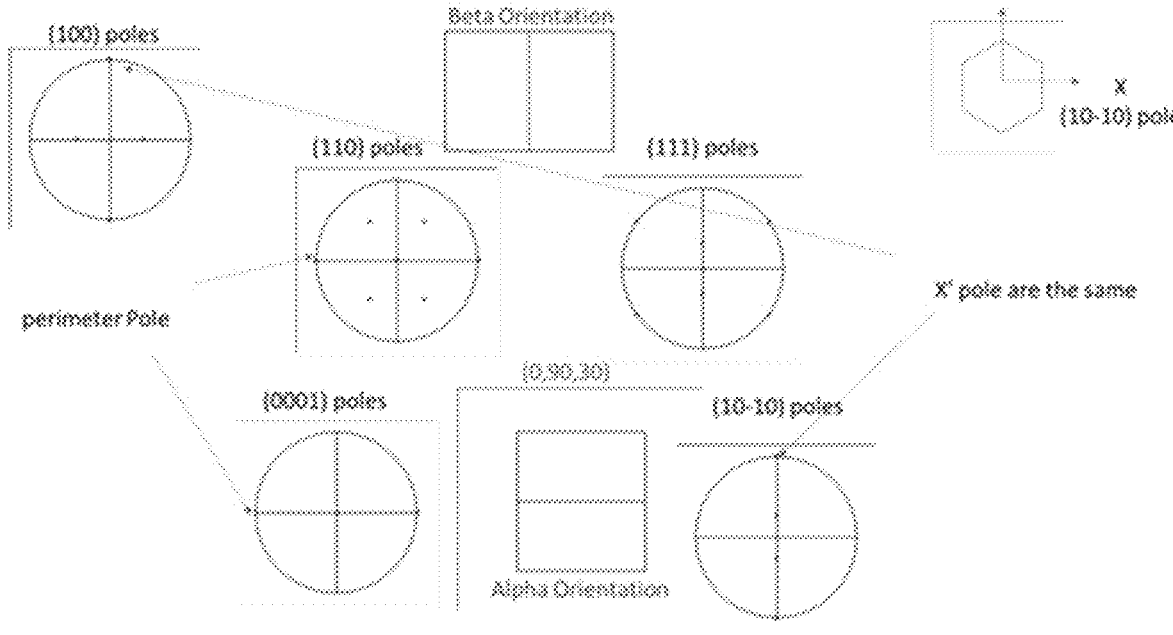
FIG. 24 is an illustration of plots of the alpha and beta phase orientations for two adjacent pixels of an example alpha data set having a c-axis misorientation of 300.
Figure 25:
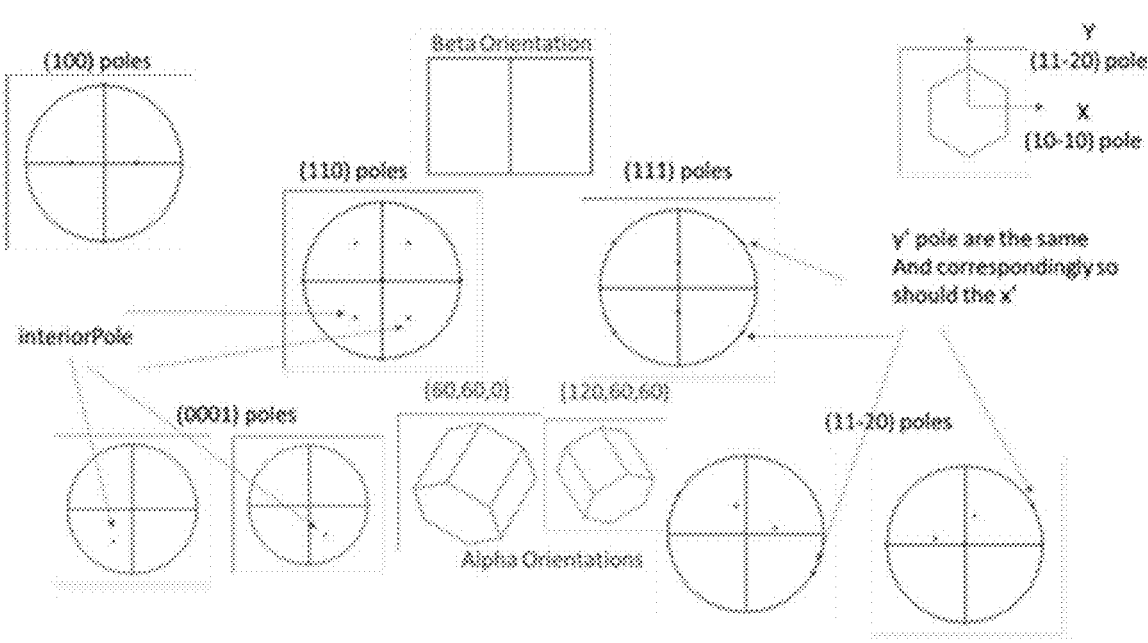
FIG. 25 is an illustration of plots of the alpha and beta phase orientations for two adjacent pixels of an example alpha data set having a c-axis misorientation of 60°.
Figure 26:
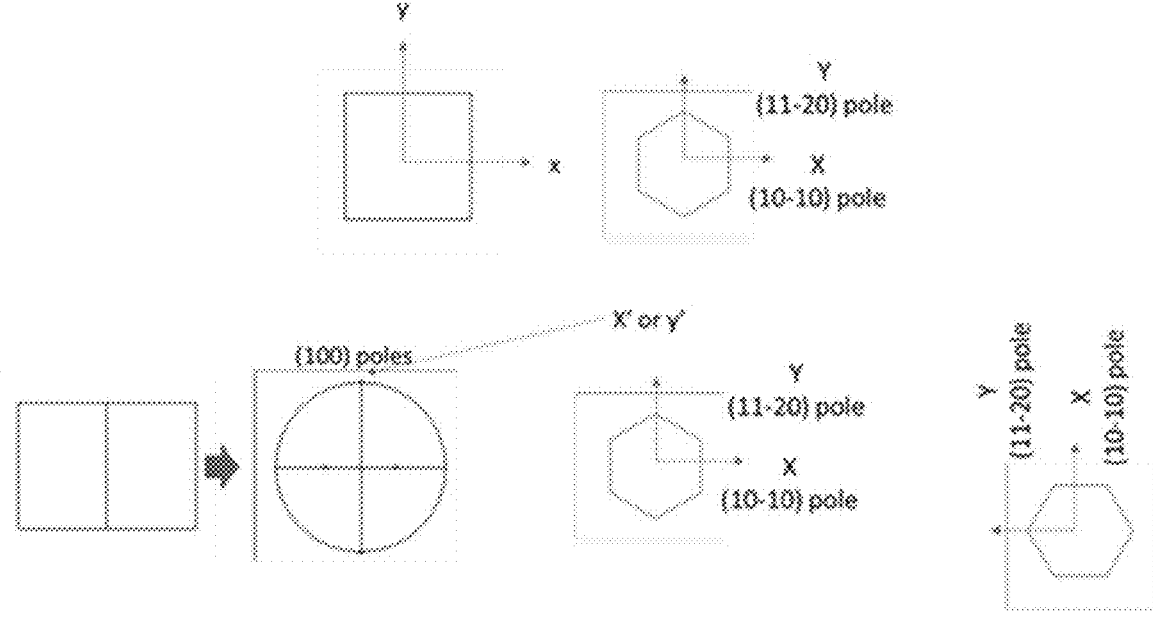
FIG. 26 is an illustration of plots of possible 300 third Euler angle misorientations due to cubic and hexagonal symmetries in relation to a cartesian coordinate system.

In some examples, to align an alpha hcp crystal to a beta crystal that obeys the Burgers relation where the c-axis of the hcp crystals are 0° or 180° misoriented, the third Euler angles (φ2) must be set equal to one another, e.g., because of the horizontal and vertical diads for the $(110)_\beta$ and $(111)_\beta$ poles. FIG. 23 is an illustration of plots of the alpha and beta phase orientations for two adjacent pixels of alpha data set 652 having a c-axis misorientation of 0° or 180°. In some examples, for c-axes of two adjacent pixels of alpha data set 652 that are 90° degrees misoriented, their third Euler angles (φ2) are 30° apart in the hcp alpha phase to align x' direction. FIG. 24 is an illustration of plots of the alpha and beta phase orientations for two adjacent pixels of alpha data set 652 having a c-axis misorientation of 30°. In some examples, for c-axes of two adjacent pixels of alpha data set 652 that are 60° degrees misoriented, their third Euler angles (φ2) are 60° apart in the hcp alpha phase system because of the horizontal cubic mirror plane for (111)_β and (110)_β poles. FIG. 25 is an illustration of plots of the alpha and beta phase orientations for two adjacent pixels of alpha data set 652 having a c-axis misorientation of 60°. In some examples, because of the cubic and hexagonal symmetries, when it comes to x' and y' in a rotation matrix, any third Euler angle (φ2) orientations could be 30° off (which is the equivalent of 90° in the hcp alpha phase due to its symmetry). FIG. 26 is an illustration of plots of possible 30° third Euler angle (φ2) misorientations due to cubic and hexagonal symmetries in relation to a cartesian coordinate system.

In some examples, the method of FIG. 7 may use symmetry operators. FIG. 27 is a table of cubic symmetry operators, and FIG. 28 is a table of hexagonal symmetry operators.

The following numbered examples may illustrate one or more aspects of this disclosure:

Example 1: A method includes: measuring, by at least one of a polarized light device, a spatially resolved acoustic spectroscopy device, or an eddy current device, an alpha phase data set indicative of an alpha phase of a crystalline structure of a material; receiving, by processing circuitry, the alpha phase data set, wherein the alpha phase data set comprises a plurality of pixels, wherein each pixel of the plurality of pixels includes a position, a first Euler angle (φ1), a second Euler angle (Φ), and a third Euler angle (φ2), wherein the third Euler angle (φ2) is missing or erroneous; adjusting, by the processing circuitry, the third Euler angle (φ2) of a pixel of the plurality of pixels; and storing, by the processing circuitry and based on adjusting the third Euler angle (φ2) of the pixel reducing a total beta phase misorientation, the alpha phase data set.

Example 2: The method of example 1, wherein the material comprises a titanium alloy.

Example 3: The method of example 1 or example 2, wherein the pixel is a first pixel, the method further includes determining, by the processing circuitry, an alpha grain of each pixel of the plurality of pixels based on a position of each pixel and the first and second Euler angles (φ1, Φ) of each pixel; determining, by the processing circuitry, which alpha grains of the plurality of pixels may be from the same prior beta grain, and adjusting, by the processing circuitry, the third Euler angle (φ2) of a second pixel of the plurality of pixels, wherein adjusting the third Euler angle (φ2) of the first pixel and the second pixel is based on: the first and second pixels are from different alpha grains, the first and second pixels being from the same prior beta grain, and the first and second pixels being adjacent to each other.

Example 4: The method of example 3, wherein determining which alpha grains of the plurality of pixels may be from the same prior beta grain comprises: randomly selecting a pixel of the plurality of pixels as the first pixel, wherein the first pixel is from a first alpha grain; selecting the second pixel based on the second pixel being from a second alpha grain different from the first alpha grain and the second pixel being adjacent to the first pixel; and determining that a c-axis misorientation between the first and second pixels is one of about 0°, about 60°, or about 90°.

Example 5: The method of example 4, further includes assigning, by the processing circuitry, a random angle value to the third Euler angle (φ2) of the first pixel; assigning, by the processing circuitry, a different angle value to the third Euler angle (φ2) of the second pixel such that the c-axis misorientation between the first and second pixels is one of about 0°, about 60°, or about 90°; assigning, by the processing circuitry, the random angle value to the third Euler angle (φ2) of each pixel of the plurality of pixels that is from the first alpha grain; and assigning, by the processing circuitry, the different angle value to the third Euler angle (φ2) of each pixel of the plurality of pixels that is from the second alpha.

Example 6: The method of example 5, further includes determining, by the processing circuitry, a first Burgers inverse transform (IT) solution to transform the first pixel to a first beta phase pixel of a beta phase data set and a second Burgers inverse transform (IT) solution to transform the second pixel to a second beta phase pixel of the beta phase data set, wherein determining the first and second Burgers IT solutions is based on reducing the total beta phase misorientation of the beta phase data set after transforming the first and second pixels by the first and second Burgers IT solutions.

Example 7: The method of example 6, wherein the first and second Burgers IT solutions are selected from a subset of less than all six of a set of six unique Burgers IT solutions that transform an alpha phase crystal to a beta phase crystal.

Example 8: The method of example 7, further includes determining, by the processing circuitry, a Burgers IT solution from the subset of less than all six unique Burgers IT solutions for each pixel of the plurality of pixels based on reducing the total beta phase misorientation of the beta phase data set after transforming each pixel by the respective Burgers IT solution; and subsequently determining, by the processing circuitry, a Burgers IT solution from the subset including all six unique Burgers IT solutions for each pixel of the plurality of pixels based on reducing the total beta phase misorientation of the beta phase data set after transforming each pixel by the respective Burgers IT solution.

Example 9: The method of example 8, further includes changing, by the processing circuitry, the value of the third Euler angle (φ2) of the first pixel by at least one of 30°, 10.53°, or 5.16°; and determining, by the processing circuitry, a Burgers IT solution from the subset including all six unique Burgers IT solutions for each pixel of the plurality of pixels based on reducing the total beta phase misorientation of the beta phase data set after transforming each pixel by the respective Burgers IT solution.

Example 10: The method of example 9, wherein a blade of a gas turbine engine comprises the material, the method further includes determining, by the processing circuitry and subsequent to changing the value of the third Euler angle (φ2) of the first pixel, at least one microtexture region (MTR) based on the alpha phase data set; outputting, by the processing circuitry, an alert based on determining the at least one MTR; determining, by the processing circuitry, a status of the blade based on at least one of the alpha phase data set or the at least one MTR; and outputting, by the processing circuitry, the status of the blade.

Example 11: A device includes: a measurement device configured to measure a crystalline structure of a material and output an alpha phase data set indicative of the measurement of the crystalline structure; a memory; and one or more processors implemented in circuitry and in communication with the memory, the one or more processors configured to: receive the alpha phase data set, wherein the alpha phase data set comprises a plurality of pixels, wherein each pixel of the plurality of pixels includes a position, a first Euler angle (φ1), a second Euler angle (Φ), and a third Euler angle (φ2), wherein the third Euler angle (φ2) is missing or erroneous; adjust the third Euler angle ($\varphi2$) of a pixel of the plurality of pixels; and store, based on adjusting the third Euler angle ($\varphi2$) of the pixel reducing a total beta phase misorientation, the alpha phase data set.

Example 12: The device of example 11, wherein the material comprises a titanium alloy.

Example 13: The device of example 11 or example 12, wherein the pixel is a first pixel, wherein the one or more processors are further configured to: determine an alpha grain of each pixel of the plurality of pixels based on a position of each pixel and the first and second Euler angles ($\varphi1$, $\Phi$) of each pixel; determine which alpha grains of the plurality of pixels may be from the same prior beta grain, and adjust the third Euler angle ($\varphi2$) of a second pixel of the plurality of pixels, wherein adjusting the third Euler angle ($\varphi2$) of the first pixel and the second pixel is based on: the first and second pixels are from different alpha grains, the first and second pixels being from the same prior beta grain, and the first and second pixels being adjacent to each other.

Example 14: The device of example 13, wherein, to determine which alpha grains of the plurality of pixels may be from the same prior beta grain, the one or more processors are configured to: randomly select a pixel of the plurality of pixels as the first pixel, wherein the first pixel is from a first alpha grain; select the second pixel based on the second pixel being from a second alpha grain different from the first alpha grain and the second pixel being adjacent to the first pixel; and determine that a c-axis misorientation between the first and second pixels is one of about 00, about 600, or about 900.

Example 15: The device of example 14, wherein the one or more processors are further configured to: assign a random angle value to the third Euler angle ($\varphi2$) of the first pixel; assign a different angle value to the third Euler angle ($\varphi2$) of the second pixel such that the c-axis misorientation between the first and second pixels is one of about 00, about 600, or about 900; assign the random angle value to the third Euler angle ($\varphi2$) of each pixel of the plurality of pixels that is from the first alpha grain; and assign the different angle value to the third Euler angle ($\varphi2$) of each pixel of the plurality of pixels that is from the second alpha.

Example 16: The device of example 15, wherein the one or more processors are further configured to: determine a first Burgers inverse transform (IT) solution to transform the first pixel to a first beta phase pixel of a beta phase data set and a second Burgers inverse transform (IT) solution to transform the second pixel to a second beta phase pixel of the beta phase data set, wherein determining the first and second Burgers IT solutions is based on reducing the total beta phase misorientation of the beta phase data set after transforming the first and second pixels by the first and second Burgers IT solutions.

Example 17: The device of example 16, wherein the first and second Burgers IT solutions are selected from a subset of less than all six of a set of six unique Burgers IT solutions that transform an alpha phase crystal to a beta phase crystal.

Example 18: The device of example 17, wherein the one or more processors are further configured to: determine a Burgers IT solution from the subset of less than all six unique Burgers IT solutions for each pixel of the plurality of pixels based on reducing the total beta phase misorientation of the beta phase data set after transforming each pixel by the respective Burgers IT solution; and subsequently determine a Burgers IT solution from the subset including all six unique Burgers IT solutions for each pixel of the plurality of pixels based on reducing the total beta phase misorientation of the beta phase data set after transforming each pixel by the respective Burgers IT solution.

Example 19: The device of example 18, wherein a blade of a gas turbine engine comprises the material, wherein the one or more processors are further configured to: change the value of the third Euler angle ($\varphi2$) of the first pixel by at least one of 30°, 10.53°, or 5.16°; determine a Burgers IT solution from the subset including all six unique Burgers IT solutions for each pixel of the plurality of pixels based on reducing the total beta phase misorientation of the beta phase data set after transforming each pixel by the respective Burgers IT solution; determine, subsequent to changing the value of the third Euler angle ($\varphi2$) of the first pixel, at least one micro-texture region (MTR) based on the alpha phase data set; output and alert based on determining the at least one MTR; determine a status of the blade based on at least one of the alpha phase data set or the at least one MTR; and output the status of the blade.

Example 20: A non-transitory computer-readable storage medium having stored thereon instructions that, when executed, configure a processor to: receive an alpha phase data set, wherein the alpha phase data set comprises a plurality of pixels, wherein each pixel of the plurality of pixels includes a position, a first Euler angle ($\varphi1$), a second Euler angle ($\Phi$), and a third Euler angle ($\varphi2$), wherein the third Euler angle ($\varphi2$) is missing or erroneous; adjust the third Euler angle ($\varphi2$) of a pixel of the plurality of pixels; and store, based on adjusting the third Euler angle ($\varphi2$) of the pixel reducing a total beta phase misorientation, the alpha phase data set.

The techniques described in this disclosure may be implemented, at least in part, in hardware, software, firmware or any combination thereof. For example, various aspects of the described techniques may be implemented within processing circuitry, which may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also form one or more processors or processing circuitry configured to perform one or more of the techniques of this disclosure.

Such hardware, software, and firmware may be implemented, and various operation may be performed within the same device, within separate devices, and/or on a coordinated basis within, among or across several devices, to support the various operations and functions described in this disclosure. In addition, any of the described units, circuits or components may be implemented together or separately as discrete but interoperable logic devices. Depiction of different features as circuits or units is intended to highlight different functional aspects and does not necessarily imply that such circuits or units must be realized by separate hardware or software components. Rather, functionality associated with one or more circuits or units may be performed by separate hardware or software components or integrated within common or separate hardware or software components. Processing circuitry described in this disclosure, including a processor or multiple processors, may be implemented, in various examples, as fixed-function circuits, programmable circuits, or a combination thereof. Fixed-function circuits refer to circuits that provide particular functionality with preset operations. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive stimulation parameters or output stimulation parameters), but the types of operations that the fixed-function circuits perform are generally immutable. In some examples, one or more of the units may be distinct circuit blocks (fixed-function or programmable), and in some examples, one or more of the units may be integrated circuits.

The techniques described in this disclosure may also be embodied or encoded in a computer-readable medium, such as a computer-readable storage medium, containing instructions that may be described as non-transitory media. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
measuring, by at least one of a polarized light device, a spatially resolved acoustic spectroscopy device, or an eddy current device, an alpha phase data set indicative of an alpha phase of a crystalline structure of a material;
receiving, by processing circuitry, the alpha phase data set, wherein the alpha phase data set comprises a plurality of pixels, wherein each pixel of the plurality of pixels includes a position, a first Euler angle ($\varphi$1), a second Euler angle $\Phi$, and a third Euler angle ($\varphi$2), wherein the third Euler angle ($\varphi$2) is missing or erroneous;
adjusting, by the processing circuitry, the third Euler angle ($\varphi$2) of a pixel of the plurality of pixels; and
storing, by the processing circuitry and based on adjusting the third Euler angle ($\varphi$2) of the pixel reducing a total beta phase misorientation, the alpha phase data set.

2. The method of claim 1, wherein the material comprises a titanium alloy.

3. The method of claim 1, wherein the pixel is a first pixel, the method further comprising:
determining, by the processing circuitry, an alpha grain of each pixel of the plurality of pixels based on a position of each pixel and the first and second Euler angles ($\varphi$1, $\Phi$) of each pixel;
determining, by the processing circuitry, which alpha grains of the plurality of pixels may be from the same prior beta grain, and
adjusting, by the processing circuitry, the third Euler angle ($\varphi$2) of a second pixel of the plurality of pixels, wherein adjusting the third Euler angle ($\varphi$2) of the first pixel and the second pixel is based on:
the first and second pixels are from different alpha grains,
the first and second pixels being from the same prior beta grain, and the first and second pixels being adjacent to each other.

4. The method of claim 3, wherein determining which alpha grains of the plurality of pixels may be from the same prior beta grain comprises:
randomly selecting a pixel of the plurality of pixels as the first pixel, wherein the first pixel is from a first alpha grain;
selecting the second pixel based on the second pixel being from a second alpha grain different from the first alpha grain and the second pixel being adjacent to the first pixel; and
determining that a c-axis misorientation between the first and second pixels is one of about 0°, about 60°, or about 90°.

5. The method of claim 4, further comprising:
assigning, by the processing circuitry, a random angle value to the third Euler angle ($\varphi$2) of the first pixel;
assigning, by the processing circuitry, a different angle value to the third Euler angle ($\varphi$2) of the second pixel such that the c-axis misorientation between the first and second pixels is one of about 0°, about 60°, or about 90°;
assigning, by the processing circuitry, the random angle value to the third Euler angle ($\varphi$2) of each pixel of the plurality of pixels that is from the first alpha grain; and
assigning, by the processing circuitry, the different angle value to the third Euler angle ($\varphi$2) of each pixel of the plurality of pixels that is from the second alpha.

6. The method of claim 5, further comprising:
determining, by the processing circuitry, a first Burgers inverse transform (IT) solution to transform the first pixel to a first beta phase pixel of a beta phase data set and a second Burgers inverse transform (IT) solution to transform the second pixel to a second beta phase pixel of the beta phase data set,
wherein determining the first and second Burgers IT solutions is based on reducing the total beta phase misorientation of the beta phase data set after transforming the first and second pixels by the first and second Burgers IT solutions.

7. The method of claim 6, wherein the first and second Burgers IT solutions are selected from a subset of less than all six of a set of six unique Burgers IT solutions that transform an alpha phase crystal to a beta phase crystal.

8. The method of claim 7, further comprising:
determining, by the processing circuitry, a Burgers IT solution from the subset of less than all six unique Burgers IT solutions for each pixel of the plurality of pixels based on reducing the total beta phase misorientation of the beta phase data set after transforming each pixel by the respective Burgers IT solution; and
subsequently determining, by the processing circuitry, a Burgers IT solution from the subset including all six unique Burgers IT solutions for each pixel of the plurality of pixels based on reducing the total beta phase misorientation of the beta phase data set after transforming each pixel by the respective Burgers IT solution.

9. The method of claim 8, further comprising:
changing, by the processing circuitry, the value of the third Euler angle ($\varphi$2) of the first pixel by at least one of 30°, 10.53°, or 5.16°; and
determining, by the processing circuitry, a Burgers IT solution from the subset including all six unique Burgers IT solutions for each pixel of the plurality of pixels based on reducing the total beta phase misorientation of the beta phase data set after transforming each pixel by the respective Burgers IT solution.

10. The method of claim 9, wherein a blade of a gas turbine engine comprises the material, the method further comprising:

determining, by the processing circuitry and subsequent to changing the value of the third Euler angle ($\varphi$2) of the first pixel, at least one microtexture region (MTR) based on the alpha phase data set;

outputting, by the processing circuitry, an alert based on determining the at least one MTR;

determining, by the processing circuitry, a status of the blade based on at least one of the alpha phase data set or the at least one MTR; and outputting, by the processing circuitry, the status of the blade.

11. A device comprising:

a measurement device configured to measure a crystalline structure of a material and output an alpha phase data set indicative of the measurement of the crystalline structure;

a memory; and one or more processors implemented in circuitry and in communication with the memory, the one or more processors configured to:

receive the alpha phase data set, wherein the alpha phase data set comprises a plurality of pixels, wherein each pixel of the plurality of pixels includes a position, a first Euler angle ($\varphi$1), a second Euler angle $\Phi$, and a third Euler angle ($\varphi$2), wherein the third Euler angle ($\varphi$2) is missing or erroneous;

adjust the third Euler angle ($\varphi$2) of a pixel of the plurality of pixels; and store, based on adjusting the third Euler angle ($\varphi$2) of the pixel reducing a total beta phase misorientation, the alpha phase data set.

12. The device of claim 11, wherein the material comprises a titanium alloy.

13. The device of claim 11, wherein the pixel is a first pixel, wherein the one or more processors are further configured to:

determine an alpha grain of each pixel of the plurality of pixels based on a position of each pixel and the first and second Euler angles ($\varphi$1, $\Phi$) of each pixel;

determine which alpha grains of the plurality of pixels may be from the same prior beta grain, and adjust the third Euler angle ($\varphi$2) of a second pixel of the plurality of pixels, wherein adjusting the third Euler angle ($\varphi$2) of the first pixel and the second pixel is based on:

the first and second pixels are from different alpha grains, the first and second pixels being from the same prior beta grain, and the first and second pixels being adjacent to each other.

14. The device of claim 13, wherein, to determine which alpha grains of the plurality of pixels may be from the same prior beta grain, the one or more processors are configured to:

randomly select a pixel of the plurality of pixels as the first pixel, wherein the first pixel is from a first alpha grain;

select the second pixel based on the second pixel being from a second alpha grain different from the first alpha grain and the second pixel being adjacent to the first pixel; and determine that a c-axis misorientation between the first and second pixels is one of about 0°, about 60°, or about 90°.

15. The device of claim 14, wherein the one or more processors are further configured to:

assign a random angle value to the third Euler angle ($\varphi$2) of the first pixel;

assign a different angle value to the third Euler angle ($\varphi$2) of the second pixel such that the c-axis misorientation between the first and second pixels is one of about 0°, about 60°, or about 90°;

assign the random angle value to the third Euler angle ($\varphi$2) of each pixel of the plurality of pixels that is from the first alpha grain; and assign the different angle value to the third Euler angle ($\varphi$2) of each pixel of the plurality of pixels that is from the second alpha.

16. The device of claim 15, wherein the one or more processors are further configured to:

determine a first Burgers inverse transform (IT) solution to transform the first pixel to a first beta phase pixel of a beta phase data set and a second Burgers inverse transform (IT) solution to transform the second pixel to a second beta phase pixel of the beta phase data set, wherein determining the first and second Burgers IT solutions is based on reducing the total beta phase misorientation of the beta phase data set after transforming the first and second pixels by the first and second Burgers IT solutions.

17. The device of claim 16, wherein the first and second Burgers IT solutions are selected from a subset of less than all six of a set of six unique Burgers IT solutions that transform an alpha phase crystal to a beta phase crystal.

18. The device of claim 17, wherein the one or more processors are further configured to:

determine a Burgers IT solution from the subset of less than all six unique Burgers IT solutions for each pixel of the plurality of pixels based on reducing the total beta phase misorientation of the beta phase data set after transforming each pixel by the respective Burgers IT solution; and subsequently determine a Burgers IT solution from the subset including all six unique Burgers IT solutions for each pixel of the plurality of pixels based on reducing the total beta phase misorientation of the beta phase data set after transforming each pixel by the respective Burgers IT solution.

19. The device of claim 18, wherein a blade of a gas turbine engine comprises the material, wherein the one or more processors are further configured to:

change the value of the third Euler angle ($\varphi$2) of the first pixel by at least one of 30°, 10.53°, or 5.16°;

determine a Burgers IT solution from the subset including all six unique Burgers IT solutions for each pixel of the plurality of pixels based on reducing the total beta phase misorientation of the beta phase data set after transforming each pixel by the respective Burgers IT solution;

determine, subsequent to changing the value of the third Euler angle ($\varphi$2) of the first pixel, at least one microtexture region (MTR) based on the alpha phase data set;

output and alert based on determining the at least one MTR;

determine a status of the blade based on at least one of the alpha phase data set or the at least one MTR; and output the status of the blade.

20. A non-transitory computer-readable storage medium having stored thereon instructions that, when executed, configure a processor to:

receive an alpha phase data set, wherein the alpha phase data set comprises a plurality of pixels, wherein each pixel of the plurality of pixels includes a position, a first Euler angle ($\varphi 1$), a second Euler angle $\Phi$, and a third Euler angle ($\varphi 2$), wherein the third Euler angle ($\varphi 2$) is missing or erroneous;

adjust the third Euler angle ($\varphi 2$) of a pixel of the plurality of pixels; and store, based on adjusting the third Euler angle ($\varphi 2$) of the pixel reducing a total beta phase misorientation, the alpha phase data set.

\* \* \* \* \*